US010735685B2

(12) United States Patent
Fujise

(10) Patent No.: US 10,735,685 B2
(45) Date of Patent: Aug. 4, 2020

(54) CONTROL METHOD OF PRESENTED INFORMATION, CONTROL DEVICE OF PRESENTED INFORMATION, AND SPEAKER

(71) Applicant: Panasonic Intellectual Property Corporation of America, Torrance, CA (US)

(72) Inventor: Akiko Fujise, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 57 days.

(21) Appl. No.: 14/831,927

(22) Filed: Aug. 21, 2015

(65) Prior Publication Data

US 2016/0062329 A1  Mar. 3, 2016

(30) Foreign Application Priority Data

Aug. 29, 2014  (JP) .................................. 2014-176189
Jan. 30, 2015  (JP) .................................. 2015-017873

(51) Int. Cl.
*H04N 5/44* (2011.01)
*H04N 21/436* (2011.01)
(Continued)

(52) U.S. Cl.
CPC ....... *H04N 5/4403* (2013.01); *H04N 21/4131* (2013.01); *H04N 21/42202* (2013.01);
(Continued)

(58) Field of Classification Search
None
See application file for complete search history.

(56) References Cited

U.S. PATENT DOCUMENTS 9,679,473 B2 * 6/2017 Bishop .................. H05B 47/11
2006/0108428 A1 * 5/2006 Broere ..................... H03G 3/32
235/472.02
(Continued)

FOREIGN PATENT DOCUMENTS

JP  2002-278639 A   9/2002
JP  2002-352352 A  12/2002
(Continued)

OTHER PUBLICATIONS

Goulet et al. (Automatic Volume Control).*
(Continued)

*Primary Examiner* — Rocio Del Mar Perez-Velez
*Assistant Examiner* — Hung H Dang
(74) *Attorney, Agent, or Firm* — Greenblum & Bernstein, P.L.C.

(57) ABSTRACT

A control method of presented information in a control device, having first and second sensor sections and that is connected to a network, is provided. The method includes acquiring information concerning a human activity detected by first and second sensor sections during first and second periods. The method also includes a first control operation of (i) determining content that is to be output by the first output section during the second period, based on the information concerning a human activity detected during the first period by the first and second sensor sections, and then (ii) causing the first output section to output the determined content in a case where it is determined that a human activity is performed during the second period in a space in which the first sensor section is disposed, based on the information concerning a human activity during the second period acquired from the first sensor section.

11 Claims, 18 Drawing Sheets

(51) Int. Cl.
   *H04N 21/41*   (2011.01)
   *H04N 21/45*   (2011.01)
   *H04N 21/422*  (2011.01)
   *H04N 21/466*  (2011.01)
   *H04N 21/442*  (2011.01)

(52) U.S. Cl.
   CPC . *H04N 21/43615* (2013.01); *H04N 21/44218* (2013.01); *H04N 21/4532* (2013.01); *H04N 21/4667* (2013.01)

(56) References Cited

U.S. PATENT DOCUMENTS

| | | | | |
|---|---|---|---|---|
| 2009/0046210 | A1* | 2/2009 | Sakamoto | H04L 12/2809 348/738 |
| 2009/0146779 | A1* | 6/2009 | Kumar | G06K 9/00885 340/5.31 |
| 2011/0162017 | A1* | 6/2011 | Dodd | H04N 21/4333 725/78 |
| 2013/0182126 | A1* | 7/2013 | Watanabe | G06F 21/36 348/207.1 |
| 2013/0219417 | A1* | 8/2013 | Gilson | H04N 21/258 725/12 |
| 2013/0279744 | A1* | 10/2013 | Ingrassia, Jr. | G06F 21/32 382/103 |

FOREIGN PATENT DOCUMENTS

| | | |
|---|---|---|
| JP | 2009-176329 A | 8/2009 |
| JP | 2009-199383 | 9/2009 |
| JP | 2011-204196 A | 10/2011 |
| JP | 2013-168110 A | 8/2013 |

OTHER PUBLICATIONS

Goulet (Automatic Volume Control—Final Report for ECE 445 Senior Design, 2013, University of Illinois) (Year: 2013).*

Masamichi Shimosaka et al., "Predicting iADL scores from pyroelectric sensor logs" SICE 2012, pp. 910-913.

* cited by examiner

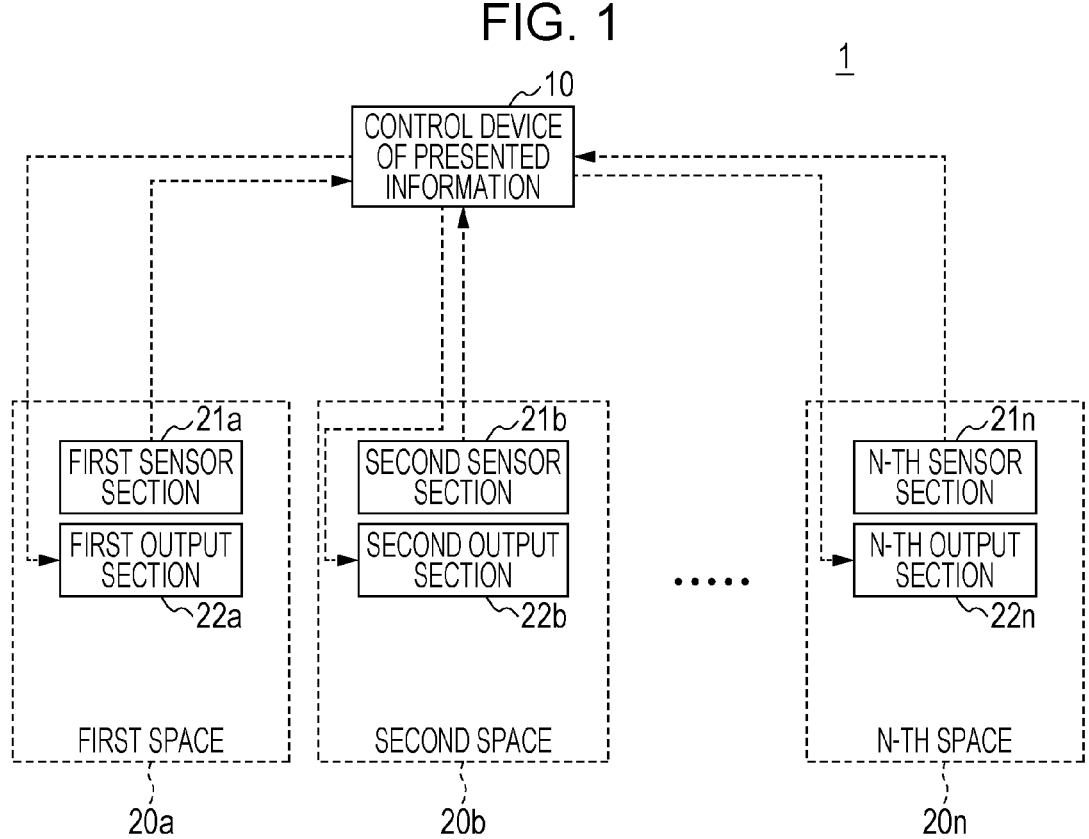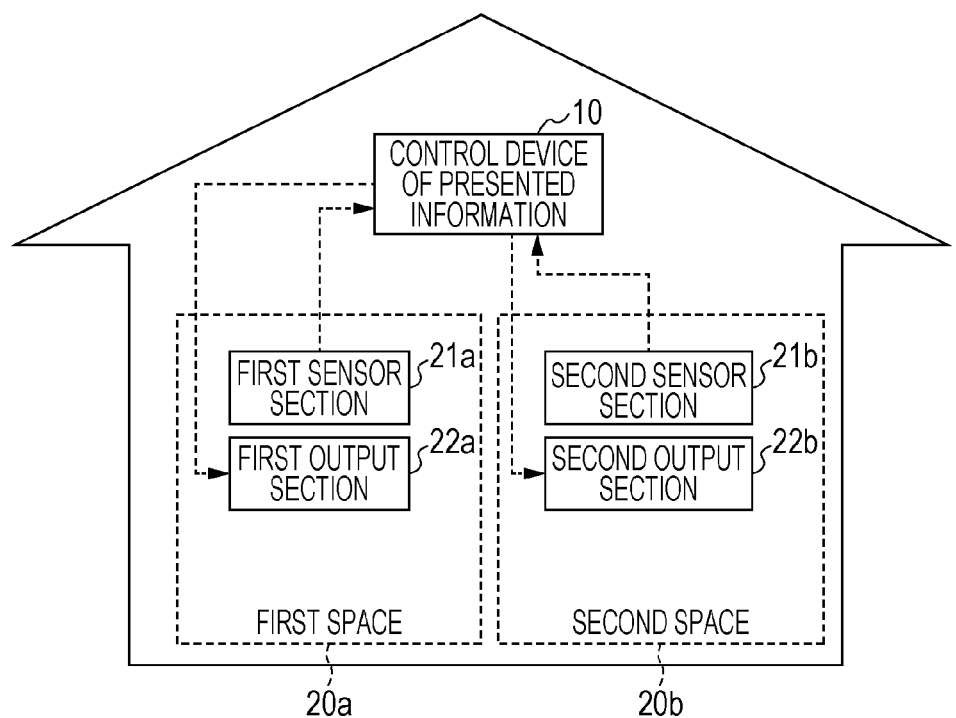

FIG. 7

| DETECTION AT CURRENT TIME t₀ | DETECTION IN X1 | DETECTION IN X2 | OUTPUT CONTENT (CURRENT TIME t₀) |
|---|---|---|---|
| FIRST SENSOR SECTION | NOT DETECTED | NOT DETECTED | DETERMINE CONTENT BASED ON TIME ZONE INCLUDING CURRENT TIME |
| FIRST SENSOR SECTION | DETECTED | NOT DETECTED | CONTINUE LAST OUTPUT OF FIRST OUTPUT SECTION |
| FIRST SENSOR SECTION | DETECTED | DETECTED | CONTINUE LAST OUTPUT OF FIRST OUTPUT SECTION |
| FIRST SENSOR SECTION | NOT DETECTED | DETECTED | CONTINUE LAST OUTPUT OF SECOND OUTPUT SECTION |

FIG. 13

| DETECTION AT CURRENT TIME t0 | THIRD PERIOD (T3) | DETECTION BY FIRST SENSOR SECTION DURING FIRST PERIOD (T1) | DETECTION BY SECOND SENSOR SECTION DURING FIRST PERIOD (T1) | OUTPUT CONTENT (CURRENT TIME t0) |
|---|---|---|---|---|
| FIRST SENSOR SECTION | DETECTED | NOT DETECTED | NOT DETECTED | DETERMINE CONTENT BASED ON TIME ZONE INCLUDING CURRENT TIME |
| FIRST SENSOR SECTION | DETECTED | DETECTED | NOT DETECTED | CONTINUE LAST OUTPUT OF FIRST OUTPUT SECTION |
| FIRST SENSOR SECTION | DETECTED | DETECTED | DETECTED | CONTINUE LAST OUTPUT OF FIRST OUTPUT SECTION |
| FIRST SENSOR SECTION | DETECTED | NOT DETECTED | DETECTED | CONTINUE LAST OUTPUT OF SECOND OUTPUT SECTION |
| FIRST SENSOR SECTION | NOT DETECTED | NOT DETECTED | NOT DETECTED | DETERMINE CONTENT BASED ON TIME ZONE INCLUDING CURRENT TIME |
| FIRST SENSOR SECTION | NOT DETECTED | DETECTED | NOT DETECTED | CONTINUE LAST OUTPUT OF FIRST OUTPUT SECTION |
| FIRST SENSOR SECTION | NOT DETECTED | DETECTED | DETECTED | CONTINUE LAST OUTPUT OF FIRST OUTPUT SECTION |
| FIRST SENSOR SECTION | NOT DETECTED | NOT DETECTED | DETECTED | CONTINUE LAST OUTPUT OF SECOND OUTPUT SECTION |

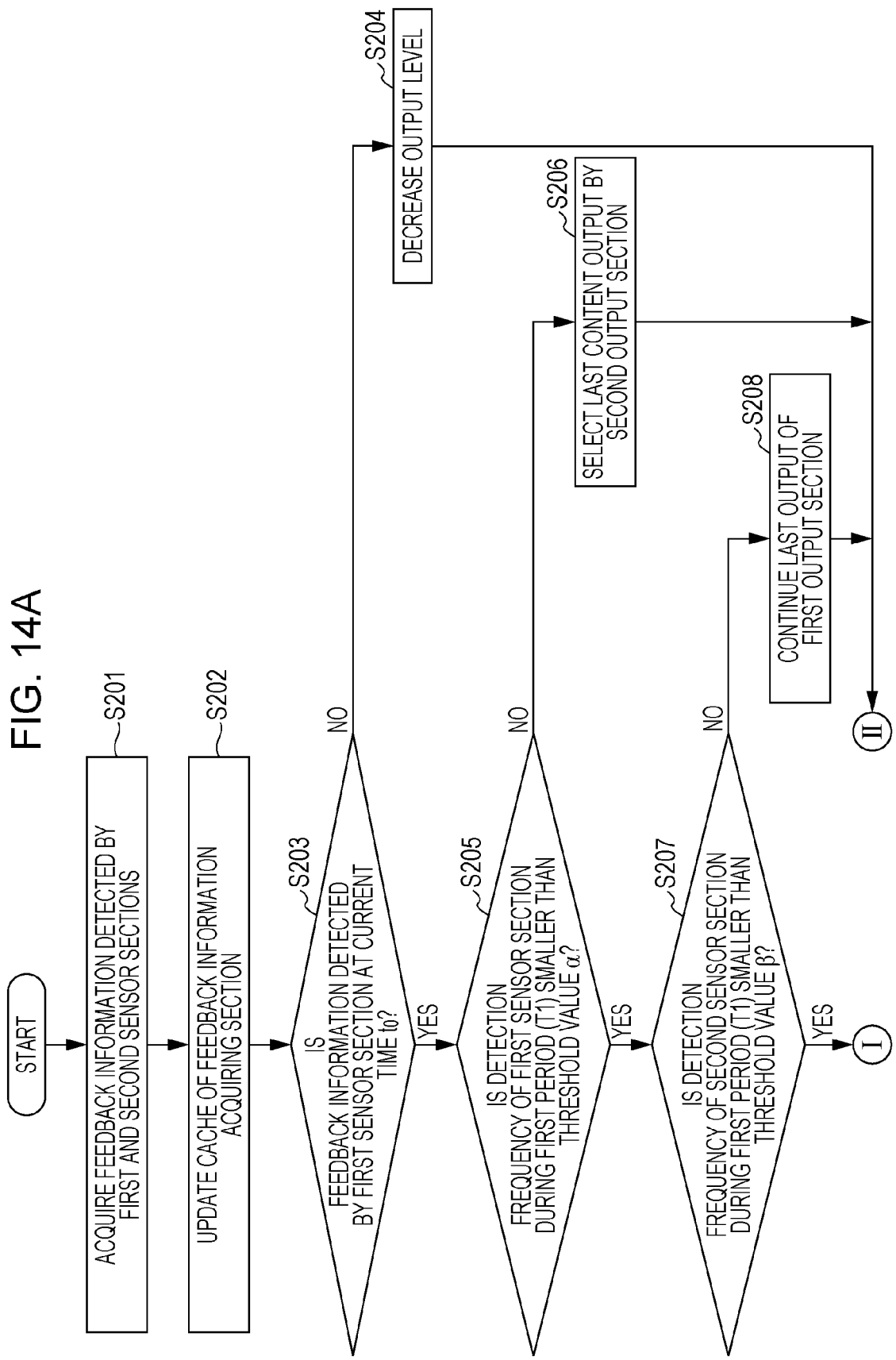

CONTROL METHOD OF PRESENTED INFORMATION, CONTROL DEVICE OF PRESENTED INFORMATION, AND SPEAKER

BACKGROUND

1. Technical Field

The present disclosure relates to a control method of presented information, a control device of presented information, and a speaker.

2. Description of the Related Art

Recently, AV appliances used at home are increasingly connected to a network. In view of this, a system for selecting and presenting appropriate content in accordance with the position and state of a user at home is proposed (see Japanese Unexamined Patent Application Publication No. 2009-199383 (hereinafter referred to as "Patent Literature") and "katudoryo sensingu ni yoru iADL sukoa no tokeiteki yosoku (Statistical Prediction of iADL Score Using Activity Amount Sensing)", The 13th System Integration Division Annual Conference of The Society of Instrument and Control Engineers, pp. 910-913 (hereinafter referred to as "Non-Patent Literature")).

SUMMARY

In one general aspect, the techniques disclosed here feature a control method of presented information in a content presentation control system including a plurality of sensor sections that perform detection in respective different spaces, a plurality of output sections that output content in the respective different spaces, and a control device of presented information that is connected to the plurality of sensor sections and the plurality of output sections via a network and that controls the plurality of sensor sections and the plurality of output sections, the control method of presented information including: acquiring information concerning a human activity detected by a first sensor section and a second sensor section among the plurality of sensor sections during a first period and a second period including a current time that is later than the first period; and the control device of presented information controlling a first output section that is disposed in a space in which the first sensor section is disposed among the plurality of output sections, the first sensor section, and the second sensor section, the control device of presented information performing, in the controlling, a first control operation of (i) determining content that is to be output by the first output section during the second period on the basis of the information concerning a human activity detected during the first period by the first sensor section and the second sensor section and then (ii) causing the first output section to output the determined content in a case where it is determined that a human activity is performed during the second period in the space in which the first sensor section is disposed on the basis of the information concerning a human activity during the second period acquired from the first sensor section.

According to the present disclosure, it is possible to provide a control method of presented information and a control device of presented information that are capable of presenting appropriate content by taking into consideration a relationship between states before and after spatial moving.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram illustrating an example of a configuration of a content presentation control system according to the present disclosure;

FIG. 2 is a diagram illustrating an example of a configuration of a content presentation control system according to Embodiment 1;

FIG. 7 is a diagram illustrating an example of conditions of content determination of the control device of presented information according to Embodiment 1;

FIG. 13 is a diagram illustrating an example of conditions of content determination of the control device of presented information according to Embodiment 2;

FIG. 14A is a flow chart illustrating an example of a feedback information analysis method according to Embodiment 2;

DETAILED DESCRIPTION

Figure 3A:
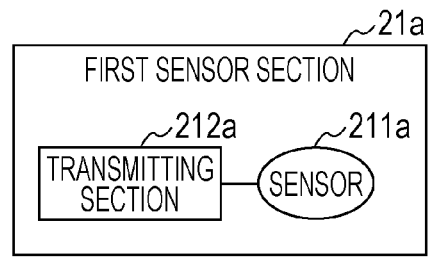
FIG. 3A is a diagram illustrating an example of a configuration of a first sensor section according to Embodiment 1.

Underlying Knowledge Forming Basis of Present Disclosure

Recently, AV appliances used at home are increasingly connected to a network. In view of this, a system for selecting and presenting appropriate content in accordance with the position and state of a user at home is proposed (see Patent Literature and Non-Patent Literature).

Patent Literature discloses an audio system that selects audio content from a content database on the basis of the health condition of a user, presents the selected audio content, and learns, as feedback information, biological information of the user during reproduction of the audio content. For example, one embodiment of Patent Literature discloses an audio system in which audio devices disposed in a plurality of spaces in a house present different kinds of audio content.

However, according to the audio system disclosed in Patent Literature, it is necessary to use a biological sensor that is always attached to a user's body or a biological sensor placed in household equipment spaces such as a washroom in order to acquire biological information of the user. This, however, places a psychological burden on the user.

Meanwhile, Non-Patent Literature proposes a method for anticipating inhabitant's activities of daily living by using non-contact type sensors provided in respective rooms of a house. Non-Patent Literature discloses a method for anticipating inhabitant's activities of daily living in one day, for example, by installing human detecting sensors in respective rooms of a house and converting response frequencies in the rooms or a positional distribution of sensor response within a certain time interval into features associated with housework and sleeping.

It is assumed that the daily living activity anticipating unit using human detecting sensors described in Non-Patent Literature is used in the audio system of Patent Literature instead of the user state anticipating unit using a biological sensor. It can be considered that this makes it possible to select and present appropriate audio content without placing a psychological burden on a user.

However, content needed by a user at home can vary depending on not only the anticipated activities of daily living but also the user's latest activity of daily living and future plan. Therefore, even if the activities of daily living are anticipated by the unit disclosed in Non-Patent Literature, it is sometimes impossible to present appropriate content to a user.

Specifically, according to the daily living activity anticipating unit using human detecting sensors described in Non-Patent Literature, a relationship between states before and after spatial moving from one room to another room is not reflected in an anticipation result. For example, in a case where a human detecting sensor detects the presence of a user in a living room that doubles as a bedroom, there is a possibility that presented content is uniquely determined irrespective of information concerning the other room where the user was before being in the living room or the response frequency of a human detecting sensor in the other room. That is, the conventional art has a problem in that appropriate content taking into consideration a relationship between states before and after spatial moving cannot be presented. For example, content presented in a room (space) in which a user is present before moving is not continuously presented in a room (space) in which the user is present after moving.

In view of this, a control method of presented information according to one aspect of the present disclosure is a control method of presented information in a content presentation control system including a plurality of sensor sections that perform detection in respective different spaces, a plurality of output sections that output content in the respective different spaces, and a control device of presented information that is connected to the plurality of sensor sections and the plurality of output sections via a network and that controls the plurality of sensor sections and the plurality of output sections, the control method of presented information including: acquiring information concerning a human activity detected by a first sensor section and a second sensor section among the plurality of sensor sections during a first period and a second period including a current time that is later than the first period; and the control device of presented information controlling a first output section that is disposed in a space in which the first sensor section is disposed among the plurality of output sections, the first sensor section, and the second sensor section, the control device of presented information performing, in the controlling, a first control operation of (i) determining content that is to be output by the first output section during the second period on the basis of the information concerning a human activity detected during the first period by the first sensor section and the second sensor section and then (ii) causing the first output section to output the determined content in a case where it is determined that a human activity is performed during the second period in the space in which the first sensor section is disposed on the basis of the information concerning a human activity during the second period acquired from the first sensor section.

The control method of presented information may be, for example, arranged such that the first sensor section and the first output section are disposed in a first space; and the second sensor section and a second output section among the plurality of output sections are disposed in a second space that is different from the first space.

The control method of presented information may be, for example, arranged such that in the controlling, the control device of presented information performs the first control immediately after the first sensor section acquires information concerning a human activity during the second period.

The control method of presented information may be, for example, arranged such that the information concerning a human activity is information concerning presence or absence of human moving.

The control method of presented information may be, for example, arranged to further include the control device of presented information acquiring information concerning time, the control device of presented information performing, in the controlling, the control operation of determining the content that is to be output by the first output section on the basis of the information concerning a human activity detected during the first period by the first sensor section and the second sensor section and the information concerning time.

The control method of presented information may be, for example, arranged such that in the controlling, the control device of presented information performs, as the first control operation, a control operation of (i) determining, as content that is to be output by the first output section during the second period, content that is output during the first period by a second output section disposed in a space in which the second sensor section is disposed among the plurality of output sections and then (ii) causing the first output section to output the determined content, in a case where (a) it is determined that no human activity is performed during the first period in a first space in which the first sensor section is disposed on the basis of the information concerning a human activity during the first period acquired from the first sensor section and it is determined that a human activity is performed during the second period in the first space on the basis of the information concerning a human activity during the second period acquired from the first sensor section and where (b) it is determined that a human activity is performed during the first period in a second space in which the second sensor section is disposed on the basis of the information concerning a human activity during the first period acquired from the second sensor section and it is determined that no human activity is performed during the second period in the second space on the basis of the information concerning a human activity during the second period acquired from the second sensor section.

The control method of presented information may be, for example, arranged such that the content presentation control system further includes a TV receiver; and in the controlling, the control device of presented information performs, as the first control operation, a control operation of (i) determining TV reproduction sound source information distributed to the TV receiver as content that is to be output by the first output section and then (ii) causing the first output section to output the determined content.

The control method of presented information may be, for example, arranged such that the content presentation control system further includes a TV receiver that is disposed in a space in which the second sensor section is disposed; a second output section that is disposed in the space in which the second sensor section is disposed among the plurality of output sections is a speaker provided in the TV receiver; and in the controlling, in a case where the second output section outputs TV reproduction sound source information distributed to the TV receiver during the first period, the control device of presented information performs, as the first control operation, a control operation of (i) determining the TV reproduction sound source information that is output by the second output section as content that is to be output during the second period by the first output section disposed in the space in which the first sensor section is disposed among the plurality of output sections and then (ii) causing the first output section to output the TV reproduction sound source information.

The control method of presented information may be, for example, arranged such that the acquiring includes the first sensor section and the second sensor section acquiring information concerning a human activity during a third period that is earlier than the first period; and in the controlling, the control device of presented information performs, as the first control operation, a control operation of (i) determining content that is to be output by the first output section during the second period in accordance with the information concerning time acquired in the acquiring and then (ii) causing the first output section to output the determined content, in a case where (a) it is determined that no human activity is performed during the first period in a first space in which the first sensor section is disposed on the basis of the information concerning a human activity during the first period acquired from the first sensor section, it is determined that a human activity is performed during the second period in the first space on the basis of the information concerning a human activity during the second period acquired from the first sensor section, and it is determined that a human activity is performed during the third period in the first space on the basis of the information concerning a human activity during the third period acquired from the first sensor section and where (b) it is determined that no human activity is performed during the first period and the third period in a second space in which the second sensor section is disposed on the basis of the information concerning a human activity during the first period and the third period acquired from the second sensor section and it is determined that no human activity is performed during the second period in the second space on the basis of the information concerning a human activity during the second period acquired from the second sensor section.

The control method of presented information may be, for example, arranged to further include accumulating, as history information, information concerning a human activity acquired by the plurality of sensor sections and information concerning content output by the plurality of output sections, in the controlling, in a case where it is determined that a human activity is performed during the second period in the space in which the first sensor section is disposed, the control device of presented information performing, as the first control operation, a control operation of (i) determining content that is to be output by the first output section during the second period on the basis of the information concerning a human activity detected during the first period by the first sensor section and the second sensor section and the history information accumulated in the accumulating and then (ii) causing the first output section to output the determined content.

The control method of presented information may be, for example, arranged such that the content presentation control system further includes a household electrical appliance or a lighting apparatus that is disposed in a space in which the second sensor section is disposed; the second sensor section is provided in the household electrical appliance or the lighting apparatus; and the second sensor section detects information concerning a human activity on the basis of operation information of the household electrical appliance or the lighting apparatus.

The control method of presented information may be, for example, arranged such that the control device of presented information manages output sensitivity information of the first output section and the second output section; and in the controlling, the control device of presented information performs a second control operation of adjusting a sound pressure level that is to be output by the first output section during the second period on the basis of a sound pressure level that is output by the second output section during the first period, the output sensitivity information of the first output section, and the output sensitivity information of the second output section. The control method of presented information may be, for example, arranged such that at least one of the acquiring, the controlling is performed by a processor included in the control device of presented information.

A control device of presented information according to one aspect of the present disclosure is a control device of presented information that is connected to a plurality of sensor sections that perform detection in respective different spaces and a plurality of output sections that output content in the respective different spaces via a network and that controls the plurality of sensor sections and the plurality of output sections, the control device of presented information including: an acquirer that acquires information concerning a human activity detected by a first sensor section and a second sensor section among the plurality of sensor sections during a first period and a second period including a current time that is later than the first period; a determiner that determines whether or not a human activity is performed during the second period in a space in which the first sensor section is disposed on the basis of the information concerning a human activity during the second period acquired by the acquirer; and a content determiner that performs a first control operation of (i) determining content that is to be output by the first output section during the second period on the basis of the information acquired by the acquiring section concerning a human activity detected during the first period and the second period by the first sensor section and the second sensor section and then (ii) causing the first output section to output the determined content in a case where the determiner determines that a human activity is performed during the second period in the space in which the first sensor section is disposed.

A speaker according to one aspect of the present disclosure is a speaker in a content presentation control system including a plurality of sensor sections that perform detection in respective different spaces, a plurality of speakers that output content in the respective different spaces, and a control device of presented information that is connected to the plurality of sensor sections and the plurality of speakers via a network and that controls the plurality of sensor sections and the plurality of speakers, the control device of presented information including: an acquirer that acquires information concerning a human activity detected by a first sensor section and a second sensor section among the plurality of sensor sections during a first period and a second period including a current time that is later than the first period; a determiner that determines whether or not a human activity is performed during the second period in a space in which the first sensor section is disposed on the basis of the information concerning a human activity during the second period acquired by the acquirer; and a content determiner that performs a first control operation of (i) determining content that is to be output by the first output section during the second period on the basis of the information acquired by the acquiring section concerning a human activity detected during the first period and the second period by the first sensor section and the second sensor section and then (ii) causing the first output section to output the determined content in a case where the determiner determines that a human activity is performed during the second period in the space in which the first sensor section is disposed, and the speaker outputting content in accordance with the first control which the control device of presented information controls.

Note that these general or specific aspects may be implemented as a system, a method, an integrated circuit, a computer program, a computer-readable storage medium such as a CD-ROM, or any selective combination thereof.

A control method of presented information and the like according to one aspect of the present disclosure are specifically described below with reference to the drawings.

Note that each of the embodiments described below illustrates a specific example of the present disclosure. Numerical value, shapes, materials, constituent elements, positions of the constituent elements, and the like described in the embodiments described below are examples and do not limit the present disclosure. Constituent elements that are not described in independent claims showing the highest-order concepts among the constituent elements in the embodiments described below are described as optional constituent elements.

That is, the following describes embodiments that are examples for realizing the control method of presented information and the like according to the present disclosure, but these embodiments are merely examples and the following description does not limit the present disclosure. Any content described in the embodiments can be combined.

Embodiment 1

A control method of presented information and the like according to Embodiment 1 are described below with reference to FIGS. 1 through 10.

Configuration of Content Presentation Control System According to Present Disclosure A content presentation control system according to the present disclosure is described below with reference to the drawings.

FIG. 1 is a diagram illustrating an example of a configuration of a content presentation control system 1 according to the present disclosure. As illustrated in FIG. 1, the content presentation control system 1 includes a control device of presented information 10, a plurality of sensor sections, and a plurality of output sections.

The plurality of sensor sections perform detection in respective different spaces. In the example illustrated in FIG. 1, a first sensor section 21a is disposed in a first space 20a, a second sensor section 21b is disposed in a second space 20b, . . . , and an N-th sensor section 21n is disposed in an N-th space 20n.

The plurality of output sections output content in the respective different spaces. In the example illustrated in FIG. 1, a first output section 22a is disposed in the first space 20a, a second output section 22b is disposed in the second space 20b, . . . , and an N-th output section 22n is disposed in the N-th space 20n. The term "content" as used herein encompass audio content, image content, or video content such as music that a user purchased, music distributed by an Internet radio, a moving image available on a free distribution website, or an on-demand news program.

The control device of presented information 10 is, for example, a server apparatus. Alternatively, the control device of presented information 10 may be a terminal apparatus such as a smartphone. The control device of presented information 10 is connected to the plurality of sensor sections and the plurality of output sections via a network and controls the plurality of sensor sections and the plurality of output sections. Details of the control device of presented information 10 will be described later.

Configuration of Content Presentation Control System

In the present embodiment, a content presentation control system installed in a house having the first space 20*a* and the second space 20*b* is described.

Figure 3B:
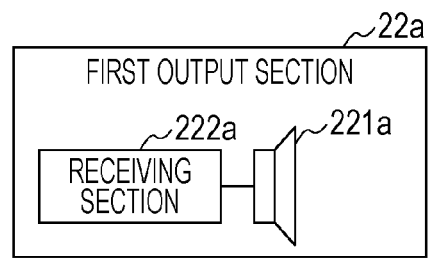
FIG. 3B is a diagram illustrating an example of a configuration of a first output section according to Embodiment 1.
Figure 4:
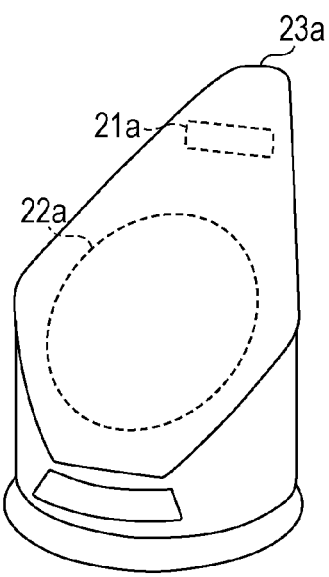
FIG. 4 is a diagram illustrating an example of a content presenting device according to Embodiment 1.
Figure 5:
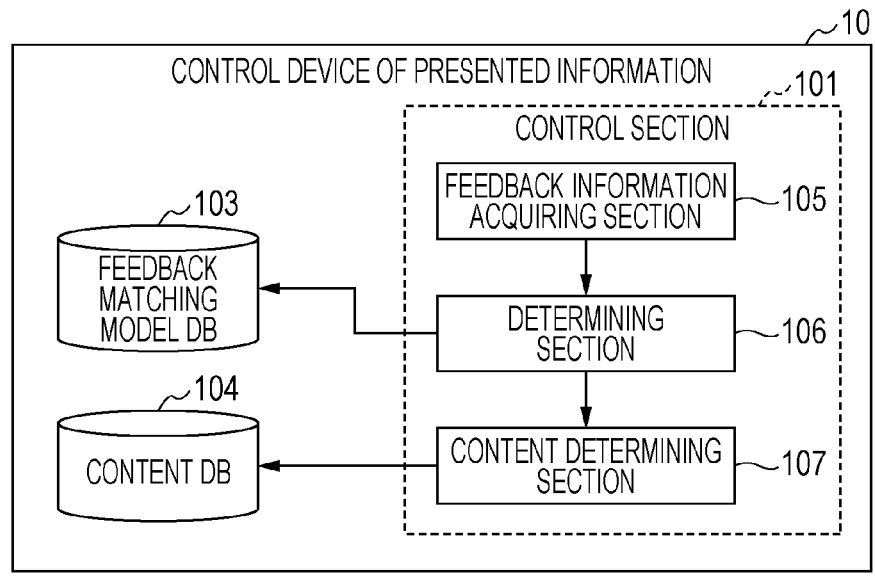
FIG. 5 is a diagram illustrating an example of a configuration of a control device of presented information according to Embodiment 1.
Figure 6:
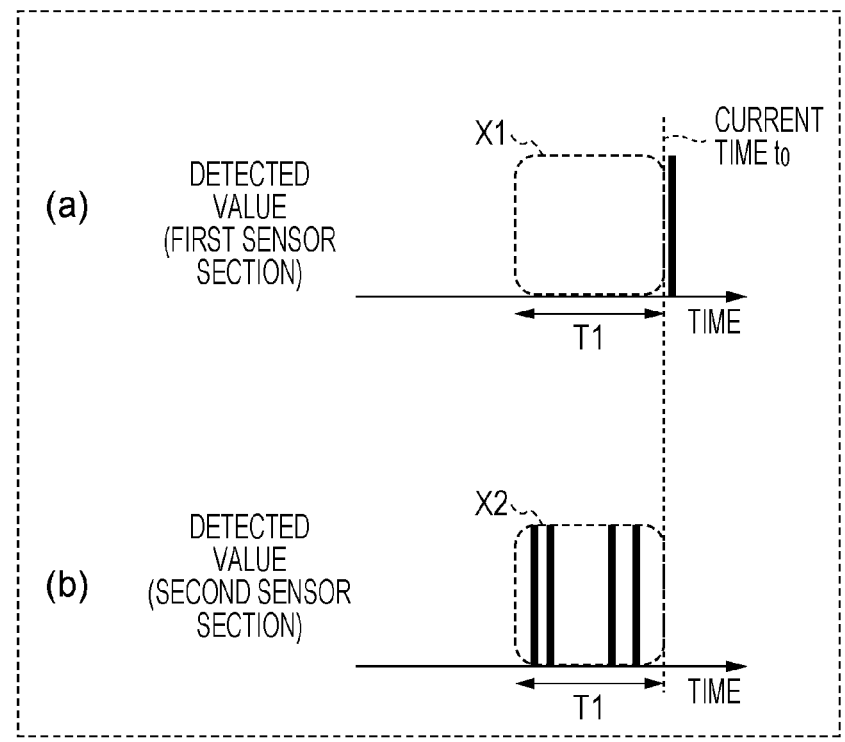
FIG. 6 is a diagram illustrating an example of detection results of a first sensor section and a second sensor section in Embodiment 1.

FIG. 2 is a diagram illustrating an example of a configuration of the content presentation control system according to Embodiment 1. FIG. 3A is a diagram illustrating an example of a configuration of a first sensor section according to Embodiment 1, and FIG. 3B is a diagram illustrating an example of a configuration of a first output section according to Embodiment 1. FIG. 4 is a diagram illustrating an example of a content presenting device according to Embodiment 1. FIG. 5 is a diagram illustrating an example of a configuration of a control device of presented information according to Embodiment 1. FIG. 6 is a diagram illustrating an example of detection results of the first sensor section and the second sensor section according to Embodiment 1. FIG. 7 is a diagram illustrating an example of conditions of content determination of the control device of presented information according to Embodiment 1.

The content presentation control system illustrated in FIG. 2 includes the control device of presented information 10, the first sensor section 21*a*, the second sensor section 21*b*, the first output section 22*a*, and the second output section 22*b*.

Configurations of Sensor Section and Output Section

The first sensor section 21*a* is disposed in the first space 20*a* and performs detection in the first space 20*a*. In the present embodiment, the first sensor section 21*a* includes, for example, a transmitting section 212*a* and a sensor 211*a*, as illustrated in FIG. 3A. The sensor 211*a* is, for example, an infrared sensor (human detecting sensor) that reacts to an approach of a thermal source having a surface temperature equivalent to a human body temperature, a laser range finder, or the like. The sensor 211*a* detects feedback information such as information concerning a human activity in the first space 20*a*, and the transmitting section 212*a* transmits a detection result of the sensor 211*a* to the control device of presented information 10.

The second sensor section 21*b* is disposed in the second space 20*b* that is different from the first space 20*a* and performs detection in the second space 20*b*. Note that a detailed configuration of the second sensor section 21*b* is similar to that of the first sensor section 21*a* and description thereof is omitted.

The first output section 22*a* is disposed in the first space 20*a* and outputs content. In the present embodiment, the first output section 22*a* includes, for example, a receiving section 222*a* and a speaker 221*a*, as illustrated in FIG. 3B and outputs audio content. In a case where the first output section 22*a* outputs video or image content, the first output section 22*a* may include a display section or a projecting section for displaying video or an image instead of or in addition to the speaker 221*a*.

The second output section 22*b* is disposed in the second space 20*b* and outputs content. Note that a detailed configuration of the second output section 22*b* is similar to that of the first output section 22*a* and description thereof is omitted.

As described above, the first sensor section 21*a* and the first output section 22*a* are disposed in the same space, i.e., the first space 20*a*, and the second sensor section 21*b* and the second output section 22*b* are disposed in the same space, i.e., the second space 20*b*. Note that a sensor section and an output section disposed in the same space may be realized as a single device. For example, the first sensor section 21*a* and the first output section 22*a* may be included in a content presenting device 23*a*, as illustrated in FIG. 4. Although it is assumed that the content presenting device 23*a* illustrated in FIG. 4 is placed on a table, the content presenting device 23*a* may be attached to a ceiling or a wall or may be placed on a floor.

Configuration of Control Device of Presented Information

The control device of presented information 10 illustrated in FIG. 2 is a server apparatus such as a home server apparatus. Alternatively, the control device of presented information 10 may be a terminal apparatus such as a smartphone. The control device of presented information 10 illustrated in FIG. 2 is connected to the first sensor section 21*a*, the second sensor section 21*b*, the first output section 22*a*, and the second output section 22*b* via a network and controls the first sensor section 21*a*, the second sensor section 21*b*, the first output section 22*a*, and the second output section 22*b*. The network is, for example, a LAN or the Internet realized by a wireless or wired communication line.

In the present embodiment, the control device of presented information 10 includes, for example, a control section 101, a feedback matching model DB 103, and a content DB 104, as illustrated in FIG. 5.

The control section 101 includes a feedback information acquiring section 105, a determining section 106, and a content determining section 107 and controls the first sensor section 21*a*, the second sensor section 21*b*, the first output section 22*a*, and the second output section 22*b*.

The control section 101 is realized by hardware and includes, for example, a processor and a memory (not illustrated). Programs for causing the control section 101 to function are stored in the memory (not illustrated).

The control section 101 of the control device of presented information 10 functions when the processor executes the programs stored in the memory (not illustrated). The programs may be stored in the memory (not illustrated) in advance. Alternatively, the programs may be downloaded from an external apparatus (not illustrated) storing the program via a network and stored in the memory (not illustrated).

Alternatively, the control section 101 may be, for example, a dedicated processing circuit in which the functions of the control section 101 are incorporated. The dedicated processing circuit is, for example, an ASIC (Application-Specific Integrated Circuit), an FPGA (Field Programmable Gate Arrays), or the like.

The feedback information acquiring section 105 is an example of an acquirer. The feedback information acquiring section 105 acquires feedback information such as information concerning a human activity detected by the first sensor section 21*a* and the second sensor section 21*b* among the plurality of sensor sections during a first period and a second period including a current time $t_0$ that is later than the first period. The first period (T1) is a period having a predetermined time length and is a period immediately before the current time $t_0$, and the second period is the current time $t_0$ or a period having a predetermined time length that includes the current time $t_0$ and is a period immediately after the current time $t_0$. The feedback information is not limited to information concerning a human activity and can be information indicative of detecting the presence of a human, information indicative of preference for content that is being output, or control information of a switch, a sound volume, or the like. The information concerning a human activity is, for example, information concerning the presence or absence of human moving. In the present embodiment, it is assumed that the feedback information is information concerning a human activity.

For example, in the case illustrated in FIG. 6, the feedback information acquiring section 105 acquires information concerning a human activity detected by the first sensor section 21a and the second sensor section 21b during the first period (T1) having a predetermined time length that is immediately before the current time $t_0$ and at the current time $t_0$. Note that the feedback information acquiring section 105 stores, for a certain duration, the acquired feedback information in a cache (not illustrated) that is provided in the feedback information acquiring section 105.

The determining section 106 determines whether or not a human activity is performed during the second period in the space in which the first sensor section 21a is disposed on the basis of the information concerning a human activity during the second period acquired by the feedback information acquiring section 105.

For example, in the case illustrated in FIG. 6, the determining section 106 determines that a human activity is performed at the current time $t_0$ in the first space 20a because the first sensor section 21a detects information concerning a human activity at the current time $t_0$. The determining section 106 determines that a human activity is performed in the second space 20b and no human activity is performed in the first space 20a during the first period (T1) because the second sensor section 21b detects information concerning a human activity (the region X2 of FIG. 7) and the first sensor section 21a does not detect information concerning a human activity (the region X1 of FIG. 7) during the first period (T1). Then, the determining section 106 determines that it is the first output section 22a that outputs content during the second period by referring to the conditions of content determination illustrated in FIG. 7.

More specifically, the determining section 106 determines that no human activity is performed during the first period (T1) in the first space 20a in which the first sensor section 21a is disposed on the basis of information concerning a human activity during the first period (T1) acquired from the first sensor section 21a, and determines that a human activity is performed during the second period in the first space 20a on the basis of information concerning a human activity during the second period (current time $t_0$) acquired from the first sensor section 21a. Moreover, the determining section 106 determines that a human activity is performed during the first period (T1) in the second space 20b in which the second sensor section 21b is disposed on the basis of information concerning a human activity during the first period (T1) acquired from the second sensor section 21b, and determines that no human activity is performed during the second period in the second space 20b on the basis of information concerning a human activity at the second period acquired from the second sensor section 21b.

Then, in a case where the determining section 106 determines that a human activity is performed during the second period in the space in which the first sensor section 21a is disposed, the determining section 106 determines that it is the first output section 22a that outputs content during the second period on the basis of information acquired by the feedback information acquiring section 105 concerning a human activity detected during the first period and the second period by the first sensor section 21a and the second sensor section 21b.

In a case where the determining section 106 determines that a human activity is performed during the second period in the space in which the first sensor section 21a is disposed, the content determining section 107 performs a first control operation of (i) determining content that is to be output by the first output section 22a during the second period on the basis of the information acquired by the feedback information acquiring section 105 concerning a human activity detected during the first period and the second period by the first sensor section 21a and the second sensor section 21b and then (ii) causing the first output section 22a to output the determined content. For example, the content determining section 107 may perform, as the first control operation, a control operation of (i) determining, as the content that is to be output by the first output section 22a during the second period, content that is output during the first period by the second output section 22b disposed in the space in which the second sensor section 21b is disposed among the plurality of output sections and then (ii) causing the first output section 22a to output the determined content. Note that the content determining section 107 performs the first control within a certain period immediately after the first sensor section 21a acquires the information concerning a human activity during the second period.

For example, in the case illustrated in FIG. 6, the content determining section 107 determines that it is the first output section 22a that outputs content during the second period in accordance with the determination result of the determining section 106. The content determining section 107 accesses the content DB 104 and acquires, as content that is to be output by the first output section 22a during the second period, content that is output by the second output section 22b during the first period (T1) on the basis of the information acquired by the feedback information acquiring section 105 concerning a human activity detected during the first period (T1) and the second period by the first sensor section 21a and the second sensor section 21b, and then transmits the acquired content to the first output section 22a. In this way, the content determining section 107 performs the first control operation of (i) determining content that is to be output by the first output section 22a during the second period and then (ii) causing the first output section 22a to output the determined content.

Note that the content determining section 107 may determine content that is to be output by the first output section 22a during the second period on the basis of the current time $t_0$ in accordance with the determination result of the determining section 106. That is, the content determining section 107 may acquire information concerning time and perform a control operation of determining content that is to be output by the first output section 22a on the basis of the information concerning a human activity during the first period detected by the first sensor section 21a and the second sensor section 21b and the information concerning time such as a current time.

In the feedback matching model DB 103, patterns of the detection frequency of feedback information, a table showing conditions of content determination illustrated in FIG. 7, and the like are accumulated. The patterns of the detection frequency of feedback information and the table showing conditions of content determination illustrated in FIG. 7 that are accumulated in the feedback matching model DB 103 are used by the determining section 106. The determining section 106 can determine whether or not a human activity is performed in the first space 20a or the second space 20b by determining whether or not a pattern of the detection frequency of feedback information and feedback information (information concerning a human activity) detected by the first sensor section 21a or the second sensor section 21b are identical or similar by comparing the pattern and the detected feedback information with each other. Moreover, the determining section 106 can determine an output section that should output content during a second period by referring to the conditions of content determination.

In the content DB 104, content such as audio content and the location of content that is being output by the first output section 22a or the second output section 22b is stored.

In the above description, an example in which the first sensor section 21a detects information concerning a human activity at the current time $t_0$ has been described. However, the present embodiment is not limited to this. The second sensor section 21b may detect information concerning a human activity at the current time $t_0$.

Figure 8A:
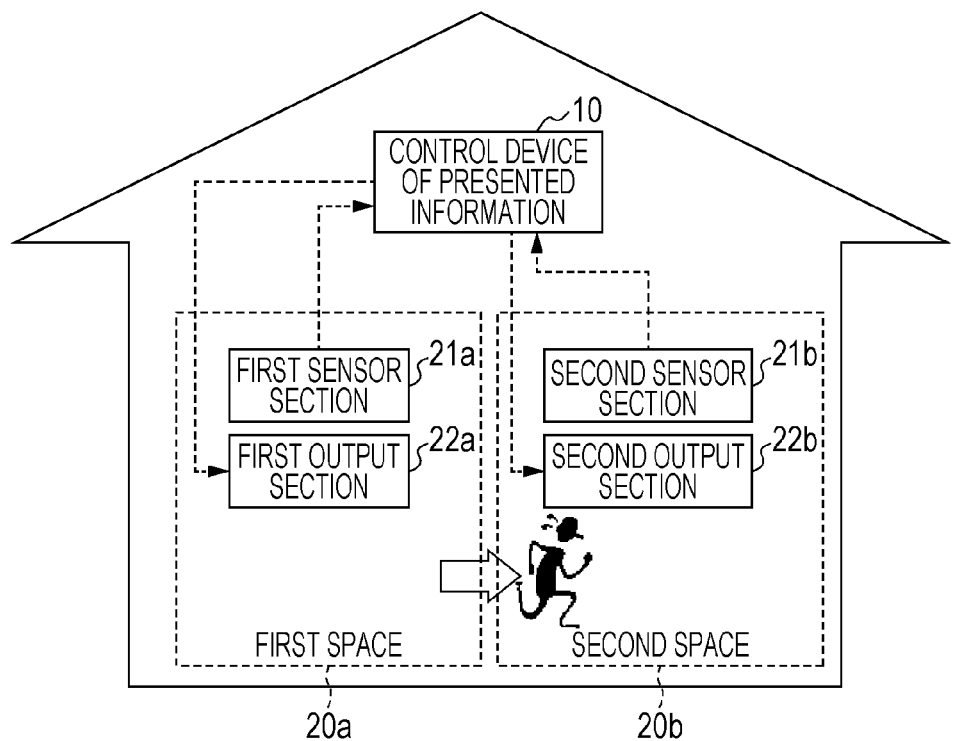
FIG. 8A is a diagram illustrating a relationship between states before and after spatial moving such as moving from a first space to a second space.
Figure 8B:
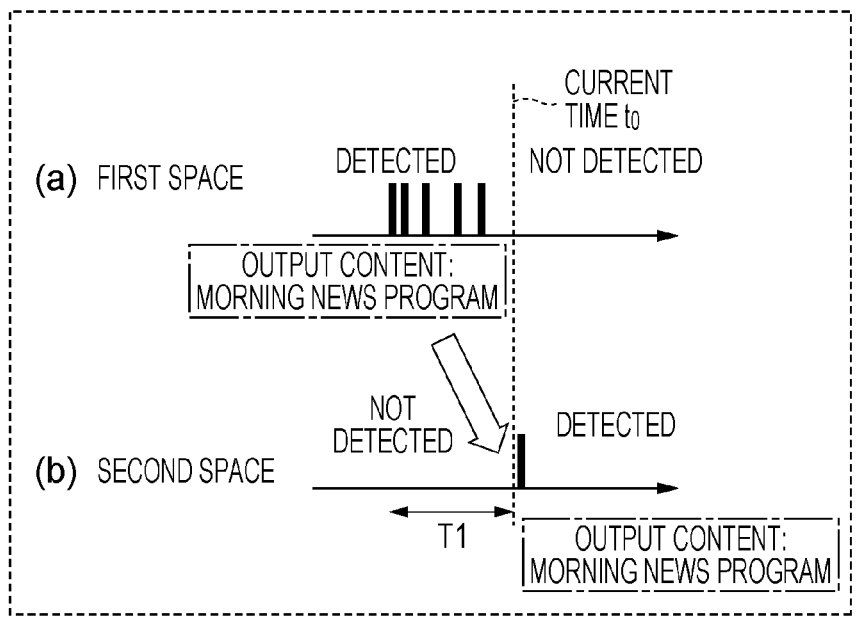
FIG. 8B is a diagram illustrating another example of detection results of the first sensor section and the second sensor section in Embodiment 1.

FIG. 8A is a diagram illustrating a relationship between states before and after spatial moving such as moving from the first space 20a to the second space 20b, and FIG. 8B is a diagram illustrating another example of detection results of the first sensor section and the second sensor section in Embodiment 1. For example, it is possible that a user who is in the first space 20a during the first period (T1) moves to the second space 20b at the current time $t_0$, and the second sensor section 21b detects information concerning a human activity at the current time $t_0$, as illustrated in FIGS. 8A and 8B. In this case, it is determined that it is the second output section 22b that outputs content at the current time $t_0$ (the second period). Then, it can be determined that, for example, a morning news program that is output by the first output section 22a during the first period (T1) is content that is to be output by the second output section 22b during the second period.

Operation of Content Presentation Control System

Next, operation of the content presentation control system configured as above is described.

Figure 9:
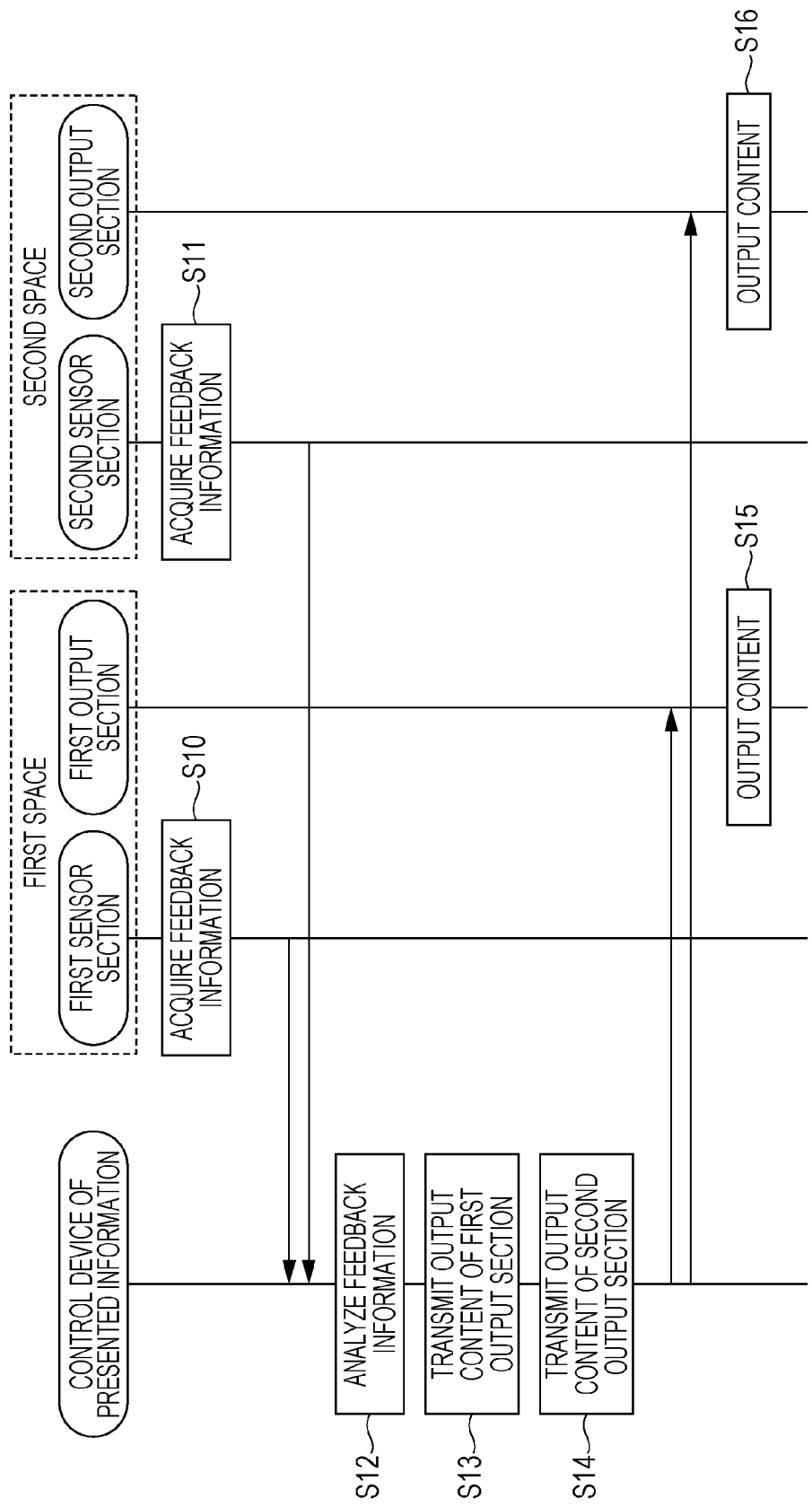
FIG. 9 is a diagram illustrating an example of sequence of the content presentation control system according to Embodiment 1.

FIG. 9 is a diagram illustrating an example of a sequence of the content presentation control system according to Embodiment 1.

First, the content presentation control system causes the control device of presented information 10 to acquire feedback information detected by the first sensor section 21a and the second sensor section 21b (S10 and S11).

Next, the control device of presented information 10 analyzes the feedback information (S12) and then determines content that is output by the first output section 22a and content that is output by the second output section 22b.

Next, the control device of presented information 10 transmits, to the first output section 22a and the second output section 22b, the content that is output by the first output section 22a and the content that is output by the second output section 22b that are determined in S12 (S13 and S14).

Next, the first output section 22a and the second output section 22b output the received content (S15 and S16).

Figure 10:
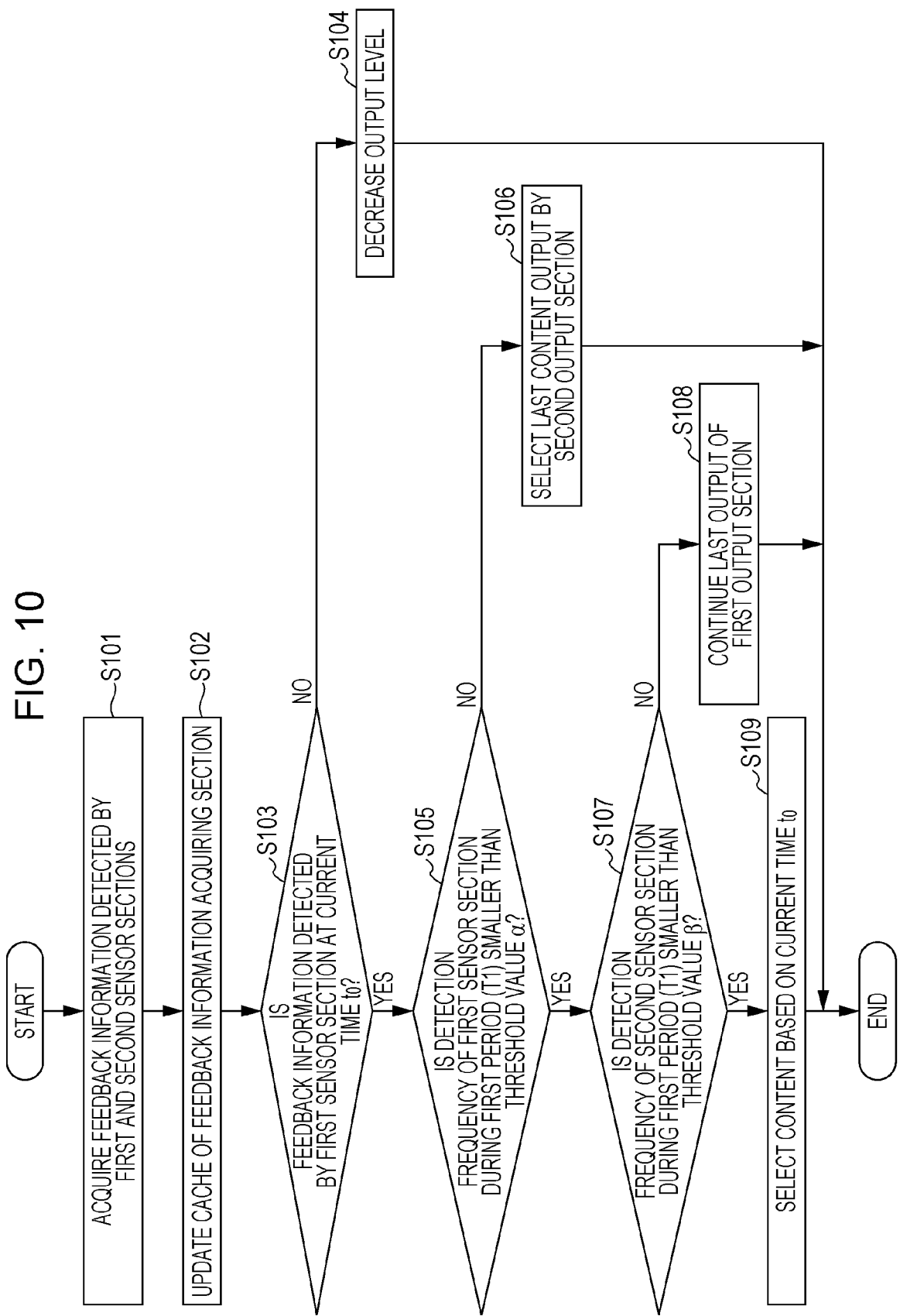
FIG. 10 is a flow chart illustrating an example of a feedback information analysis method illustrated in S12 of FIG. 9.

FIG. 10 is a flow chart illustrating an example of the feedback information analysis method illustrated in S12 of FIG. 9. The following describes a method for determining content that is output by the first output section 22a and content that is output by the second output section 22b without applying the conditions of content determination illustrated in FIG. 7 accumulated in the feedback matching model DB 103. FIG. 10 illustrates how the control device of presented information 10 analyzes feedback information and determines content that is output by the first output section 22a. Note that processing for determining content that is output by the second output section 22b is similar to the processing for determining content that is output by the first output section 22a, and therefore the following describes only the processing for determining content that is output by the first output section 22a.

First, the feedback information acquiring section 105 acquires feedback information detected by the first sensor section 21a and the second sensor section 21b (S101) and then updates the cache of the feedback information acquiring section 105 (S102).

Next, the determining section 106 determines whether or not feedback information (information concerning a human activity) is detected by the first sensor section 21a at the current time $t_0$ (S103). In a case where it is determined in S103 that no feedback information is detected by the first sensor section 21a at the current time $t_0$ (No in S103), the content determining section 107 decreases an output level of content that is output by the first output section 22a (or sets the output level to 0 (zero)) (S104).

Next, in a case where it is determined in S103 that feedback information is detected by the first sensor section 21a at the current time $t_0$ (Yes in S103), the determining section 106 determines whether or not a feedback information detection frequency of the first sensor section 21a during the first period (T1) is smaller than a threshold value $\alpha$ (S105). The threshold value $\alpha$ of the detection frequency is accumulated in the feedback matching model DB 103. The threshold value $\alpha$ is an index by which it can be determined whether or not the detection frequency matches a feedback information detection frequency pattern of the first sensor section 21a.

In a case where it is determined in S105 that the feedback information detection frequency of the first sensor section 21a during the first period (T1) is not smaller than the threshold value $\alpha$ (No in S105), it can be determined that it is highly likely that a human (user) moved during the first period (T1) from the second space 20b in which the second output section 22b is disposed to the first space 20a in which the first output section 22a is disposed. Accordingly, the content determining section 107 determines that the first output section 22a outputs content that is output by the second output section 22b immediately before (immediately before the current time $t_0$ or during the first period (T1)) (S106).

Meanwhile, in a case where it is determined in S105 that the feedback information detection frequency of the first sensor section 21a during the first period (T1) is smaller than the threshold value $\alpha$ (Yes in S105), the determining section 106 determines whether or not a feedback information detection frequency of the second sensor section 21b during the first period (T1) is smaller than a threshold value $\beta$ (S107). The threshold value $\beta$ of the detection frequency is accumulated in the feedback matching model DB 103. The threshold value $\beta$ is an index by which it can be determined whether or not the detection frequency matches a feedback information detection frequency pattern of the second sensor section 21b. Note that the threshold value $\beta$ is equal to or lower than the threshold value $\alpha$.

In a case where it is determined in S107 that the feedback information detection frequency of the second sensor section 21b during the first period (T1) is not smaller than the threshold value $\beta$ (No in S107), it can be determined that it is highly likely that a human (user) is present continuously from the first period (T1) in the first space 20a in which the first output section 22a is disposed. Accordingly, the content determining section 107 determines that the first output section 22a continues to output content that is output by the first output section 22a immediately before (immediately before the current time $t_0$ or during the first period (T1)) (S108).

Meanwhile, in a case where it is determined in S107 that the feedback information detection frequency of the second sensor section 21b during the first period (T1) is smaller than the threshold value β (Yes in S107), the content determining section 107 selects content that is to be output by the first output section 22a on the basis of the current time $t_0$ (S109), and the processing is finished. The content selected on the basis of the current time $t_0$ is, for example, a program such as a radio program broadcast during a time zone including the current time $t_0$ or predetermined content preferred by a user (human) during the time zone.

Effects and Others of Embodiment 1

As described above, according to the present embodiment, it is possible to provide a control method of presented information and a control device of presented information that are capable of presenting appropriate content by taking into consideration a relationship between states before and after spatial moving.

For example, a control method of presented information in a content presentation control system including a plurality of sensor sections that perform detection in respective different spaces, a plurality of output sections that output content in the respective different spaces, and a control device of presented information that is connected to the plurality of sensor sections and the plurality of output sections via a network and that controls the plurality of sensor sections and the plurality of output sections, the control method of presented information including: acquiring information concerning a human activity detected by a first sensor section and a second sensor section among the plurality of sensor sections during a first period and a second period including a current time that is later than the first period; and the control device of presented information controlling a first output section that is disposed in a space in which the first sensor section is disposed among the plurality of output sections, the first sensor section, and the second sensor section. The control device of presented information performs, in the controlling, a first control operation of (i) determining content that is to be output by the first output section during the second period on the basis of the information concerning a human activity detected during the first period by the first sensor section and the second sensor section and then (ii) causing the first output section to output the determined content in a case where it is determined that a human activity is performed during the second period in the space in which the first sensor section is disposed on the basis of the information concerning a human activity during the second period acquired from the first sensor section.

With the arrangement, it is possible to present appropriate content by taking into consideration a relationship between states before and after spatial moving.

One aspect of the control method of presented information may be, for example, such that in the controlling, the control device of presented information performs, as the first control operation, a control operation of (i) determining, as content that is to be output by the first output section during the second period, content that is output during the first period by a second output section disposed in a space in which the second sensor section is disposed among the plurality of output sections and then (ii) causing the first output section to output the determined content, in a case where (a) it is determined that no human activity is performed during the first period in a first space in which the first sensor section is disposed on the basis of the information concerning a human activity during the first period acquired from the first sensor section and it is determined that a human activity is performed during the second period in the first space on the basis of the information concerning a human activity during the second period acquired from the first sensor section and where (b) it is determined that a human activity is performed during the first period in a second space in which the second sensor section is disposed on the basis of the information concerning a human activity during the first period acquired from the second sensor section and it is determined that no human activity is performed during the second period in the second space on the basis of the information concerning a human activity during the second period acquired from the second sensor section.

This makes it possible to present appropriate content by taking into consideration a relationship between states before and after spatial moving even in a scene where appropriate content for a user varies before and after the spatial moving by using feedback information during the first period (T1) and the second period.

In this case, content may be output in a next room (the first space) at the same sound volume as content that is output in a previous room (the second space). Specifically, the control method of presented information may be arranged such that the control device of presented information manages output sensitivity information of the first output section and the second output section; and in the controlling, the control device of presented information performs a second control operation of adjusting a sound pressure level that is to be output by the first output section during the second period on the basis of a sound pressure level that is output by the second output section during the first period, the output sensitivity information of the first output section, and the output sensitivity information of the second output section.

In a case where content is output in the next room (the first space) at the same sound volume as the content that is output in the previous room (the second space), the sound volume standard of the second output section (for example, a speaker of a television set) disposed in the previous room (the second space) is sometimes different from that of the first output section (for example, a speaker of an audio appliance) disposed in the next room (the first space). In view of this, the control device of presented information manages output sensitivity information of the first output section and the second output section. This allows the control device of presented information to adjust the sound volume of content that is output by the second output section to the sound volume of the content that is output by the first output section without giving the user a sense of strangeness. This makes it possible to suppress the user's sense of strangeness caused by an extreme increase or decrease in the sound volume of content before and after moving of the user between different spaces.

Furthermore, the control method of presented information may be arranged to further include the control device of presented information acquiring information concerning time, the control device of presented information performing, in the controlling, the control operation of determining the content that is to be output by the first output section on the basis of the information concerning a human activity detected during the first period by the first sensor section and the second sensor section and the information concerning time.

With the arrangement, it is possible to present appropriate content by taking into consideration a relationship between states before and after spatial moving even in a scene where appropriate content for a user varies before and after the spatial moving by using feedback information during the first period (T1) and the second period and information concerning time such as a current time.

Modification

In the present embodiment, for simplification of description, a case where a human moves between the first space 20a and the second space 20b (for example, FIG. 10) has been described. However, the present embodiment is not limited to this, and a human may move among three or more spaces.

Figure 11:
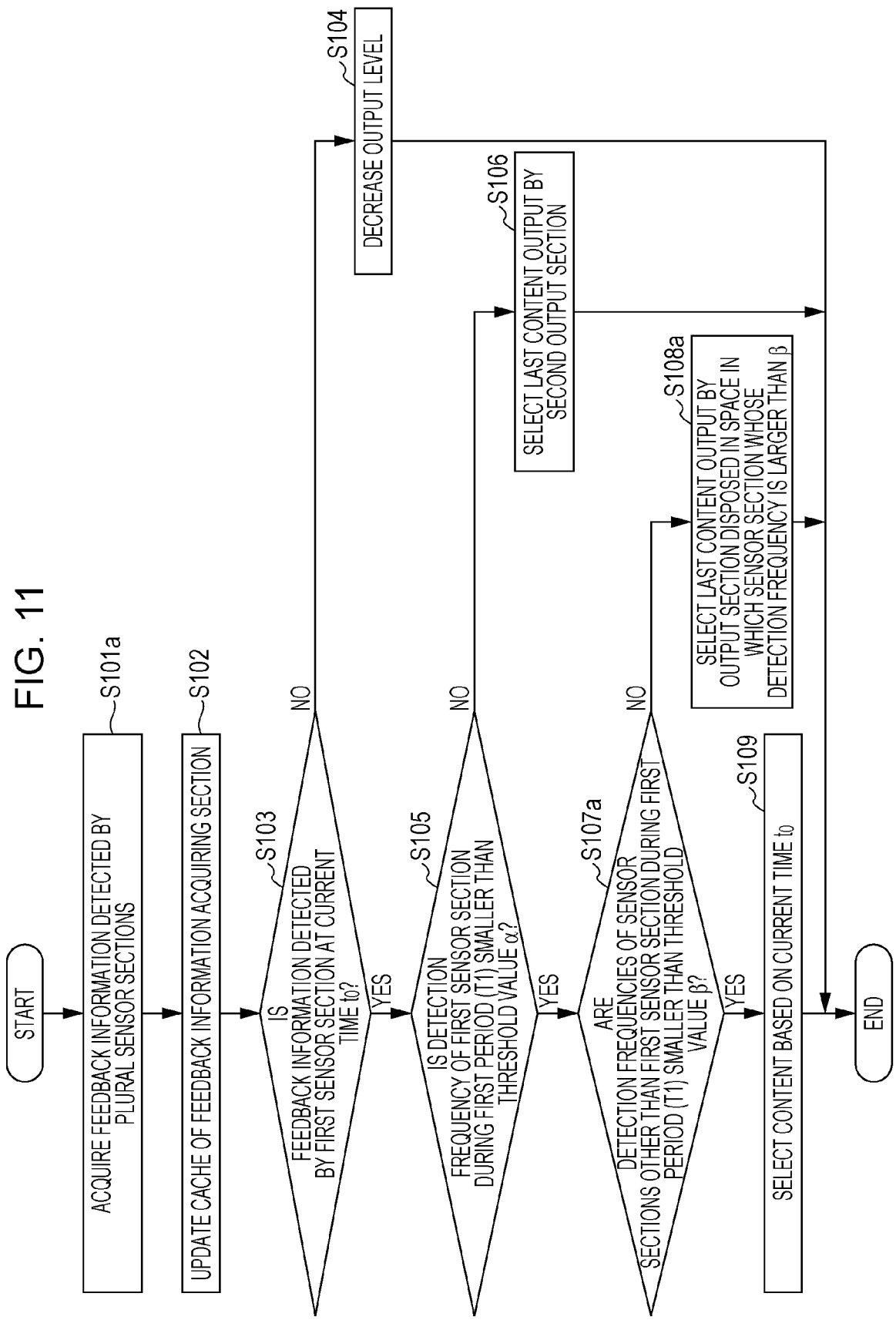
FIG. 11 is a flow chart illustrating another example of a feedback information analysis method of a control device of presented information 10.

FIG. 11 is a flow chart illustrating another example of a feedback information analysis method of the control device of presented information 10. Elements that are similar to those of FIG. 10 are given identical reference signs and are not described in detail.

First, the feedback information acquiring section 105 acquires feedback information detected by the plurality of sensor sections 21 (S101a), and then updates the cache of the feedback information acquiring section 105 (S102). Steps S103 through S105 and S109 are identical to those described above and description thereof is omitted. Steps S107a and S108a are described below.

In S107a, the determining section 106 determines whether or not feedback information detection frequencies of other sensor sections 21 excluding the first sensor section 21a during the first period (T1) are smaller than the threshold value β (S107a).

In a case where it is determined in S107a that not all of the feedback information detection frequencies of the other sensor sections 21 are smaller than the threshold value β, i.e., there is(are) another(other) sensor section(s) 21 whose detection frequency is larger than the threshold value β (No in S107a), the content determining section 107 determines, as content that is to be output by the first output section 22a, content that is output immediately before (immediately before the current time $t_0$ or during the first period (T1)) by an output section 22 disposed in a space in which a sensor section 21 whose detection frequency is highest among the other sensor section(s) 21 whose detection frequency is larger than the threshold value β is disposed (S108a). This is because it can be determined that it is highly likely that a human (user) moved during the first period (T1) from the space in which the sensor section 21 whose detection frequency is highest among the other sensor section(s) 21 whose detection frequency is larger than the threshold value β is disposed to the first space 20a in which the first output section 22a is disposed.

Embodiment 2

Embodiment 1 has dealt with a case where appropriate content is determined and presented by using feedback information during a second period including a current time and feedback information during a first period (T1) that is a predetermined period immediately before the current time in order to take into consideration a relationship between states before and after spatial moving. However, the present disclosure is not limited to this. The present embodiment deals with a case where appropriate content is determined and presented by using feedback information during a third period (T3) previous to the first period (T1) in addition to the feedback information during the first period (T1) and the feedback information during the second period. Differences from Embodiment 1 are mainly described below.

Configuration of Control Device of Presented Information

Figure 12:
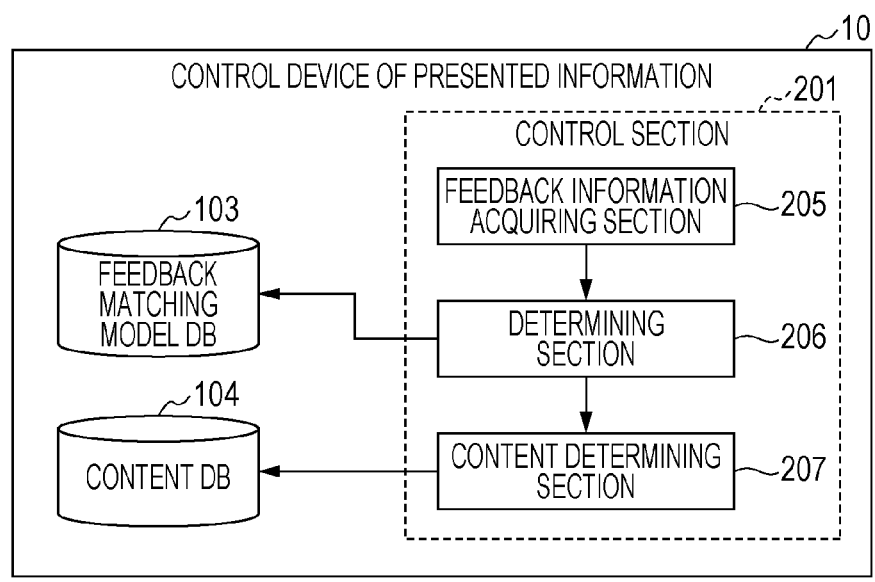
FIG. 12 is a diagram illustrating an example of a configuration of a control device of presented information according to Embodiment 2.

FIG. 12 is a diagram illustrating an example of a configuration of a control device of presented information according to Embodiment 2. Elements that are similar to those of FIG. 5 are given identical reference signs and are not described in detail. FIG. 13 is a diagram illustrating an example of conditions of content determination of the control device of presented information according to Embodiment 2.

The control device of the presented information 10 illustrated in FIG. 12 is different from the control device of presented information 10 illustrated in FIG. 5 according to Embodiment 1 in terms of a configuration of a control section 201, i.e., configurations of a feedback information acquiring section 205, a determining section 206, and a content determining section 207.

The feedback information acquiring section 205 is an example of an acquirer and has the functions of the feedback information acquiring section 105. The feedback information acquiring section 205 further acquires information concerning a human activity during the third period (T3) previous to the first period (T1) from a first sensor section 21a and a second sensor section 21b.

The determining section 206 determines whether or not a human activity is performed during a second period in a space in which the first sensor section 21a is disposed on the basis of information concerning a human activity during the second period acquired by the feedback information acquiring section 205. In a case where it is determined that a human activity is performed during the second period in the space in which the first sensor section 21a is disposed, the determining section 206 determines an output section that outputs content during the second period on the basis of information acquired by feedback information acquiring section 205 concerning a human activity detected during the first period, the second period, and the third period by the first sensor section 21a and the second sensor section 21b.

In a case where it is determined that a human activity is performed during the second period in the space in which the first sensor section 21a is disposed, the determining section 206 determines that it is the first output section 22a that outputs content during the second period.

For example, the determining section 206 determines that no human activity is performed during the first period (T1) in the first space 20a in which the first sensor section 21a is disposed on the basis of information concerning a human activity during the first period (T1) acquired from the first sensor section 21a, determines that a human activity is performed during the second period in the first space 20a on the basis of information concerning a human activity during the second period acquired from the first sensor section 21a, and determines that a human activity is performed during the third period (T3) in the first space on the basis of information concerning a human activity during the third period (T3) acquired from the first sensor section 21a. Furthermore, the determining section 206 determines that no human activity is performed during the first period (T1) and the third period (T3) in the second space 20b in which the second sensor section 21b is disposed on the basis of information concerning a human activity during the first period (T1) and the third period (T3) acquired from the second sensor section 21b and determines that no human activity is performed during the second period in the second space 20b on the basis of information concerning a human activity during the second period acquired from the second sensor section 21b. In this case, the determining section 206 transmits the determination results to the content determining section 207. Note that although the determining section 206 determines that it is the first output section 22a that outputs content during the second period, this determination may be made by the content determining section 207.

The content determining section 207 acquires information concerning time. Furthermore, in a case where the determining section 206 determines that a human activity is performed during the second period in the space in which the first sensor section 21a is disposed, the content determining section 207 performs a first control operation of (i) determining content that is to be output by the first output section 22a during the second period on the basis of information acquired by the feedback information acquiring section 205 concerning a human activity detected during the first period (T1), the second period, and the third period (T3) by the first sensor section 21a and the second sensor section 21b and then (ii) causing the first output section 22a to output the determined content.

In the present embodiment, the content determining section 207 performs a first control operation of (i) determining the content that is to be output by the first output section 22a during the second period by referring to the conditions of content determination illustrated in FIG. 13 and then (ii) causing the first output section 22a to output the determined content.

In a case where the determining section 206 determines that a human activity is performed during the second period in the space in which the first sensor section 21a is disposed, the content determining section 207 may perform, as the first control operation, a control operation of (i) determining the content that is to be output by the first output section 22a during the second period, for example, in accordance with information concerning the current time $t_0$ and then (ii) causing the first output section 22a to output the determined content.

Operation of Control Device of Presented Information

Figure 14B:
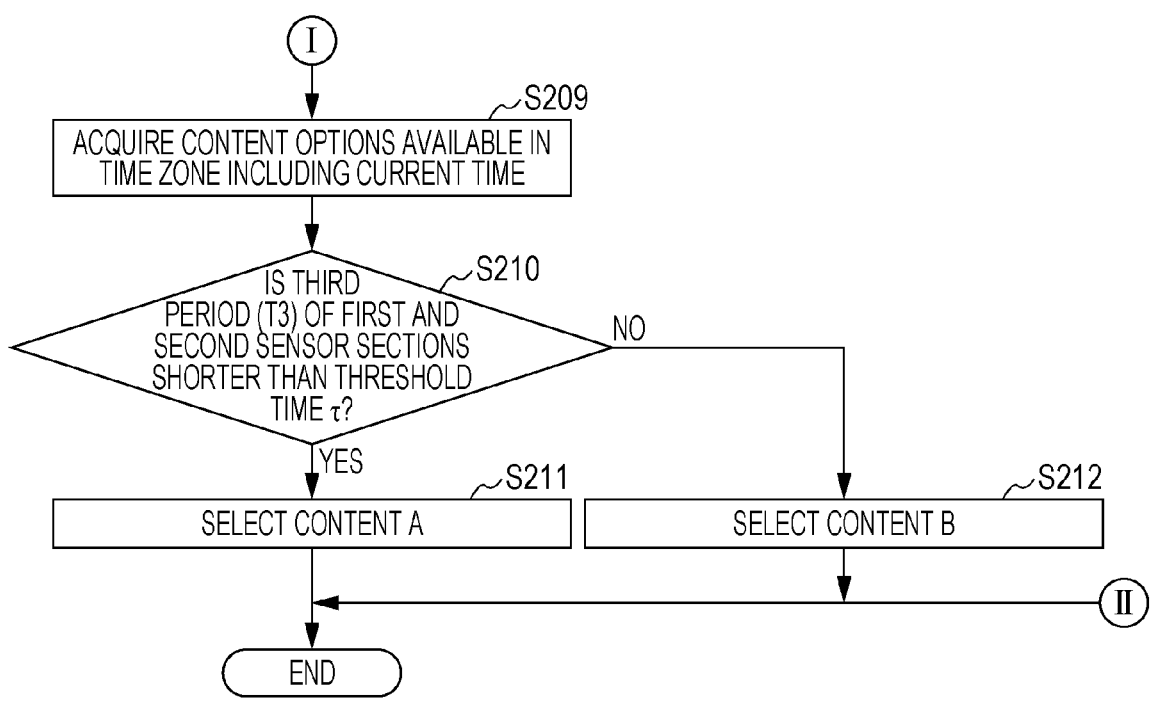
FIG. 14B is a flow chart illustrating an example of a feedback information analysis method according to Embodiment 2.

Next, operation of the control device of presented information configured as above according to the present embodiment is described below. With reference to FIGS. 14A and 14B, the following describes a method for determining content that is output by the first output section 22a and content that is output by the second output section 22b without using the conditions of content determination illustrated in FIG. 13 accumulated in the feedback matching model DB 103.

FIGS. 14A and 14B are a flow chart illustrating an example of a feedback information analysis method according to Embodiment 2. Processing in S201 through S208 is identical to that in S101 through S108 and description thereof is omitted.

In a case where it is determined in S207 that a feedback information detection frequency of the second sensor section 21b is smaller than a threshold value β (Yes in S207), the content determining section 207 acquires, as options of content that is to be output by the first output section 22a, content options available during a time zone including the current time $t_0$ on the basis of the current time $t_0$ (S209).

Next, the content determining section 207 checks whether or not the determining section 206 has determined that the time length of the third period (T3) of the first output section 22a and the second output section 22b is shorter than a threshold period τ (S210).

Next, the content determining section 207 selects content A or content B from among the content options in accordance with the result of checking in S210 (S211, S212). In a case where the time length of the third period (T3) of the first output section 22a and the second output section 22b is longer than the threshold period τ, it can be anticipated that a user (human) is absent during the first period (T1) and the third period (T3) and that the user is present in the first space 20a (for example, comes home) at the current time $t_0$. Meanwhile, in a case where the time length of the third period (T3) of the first output section 22a or the second output section 22b is shorter than the threshold period τ, it can be anticipated that no feedback information is detected because a user (human) is, for example, sleeping in a space in which an output section whose third period (T3) is shorter than the threshold period τ is disposed.

Examples of operation of the control device of presented information according to the present embodiment are described below by taking life scenes of a user (human) as examples. In the following description, it is assumed that the user is living alone and that the content presentation control system according to the present embodiment is installed in the house illustrated in FIG. 2 or in an apartment for single-persons. However, the number of persons living together with the user and the form of residence are not limited to this.

Example 1

Figure 15:
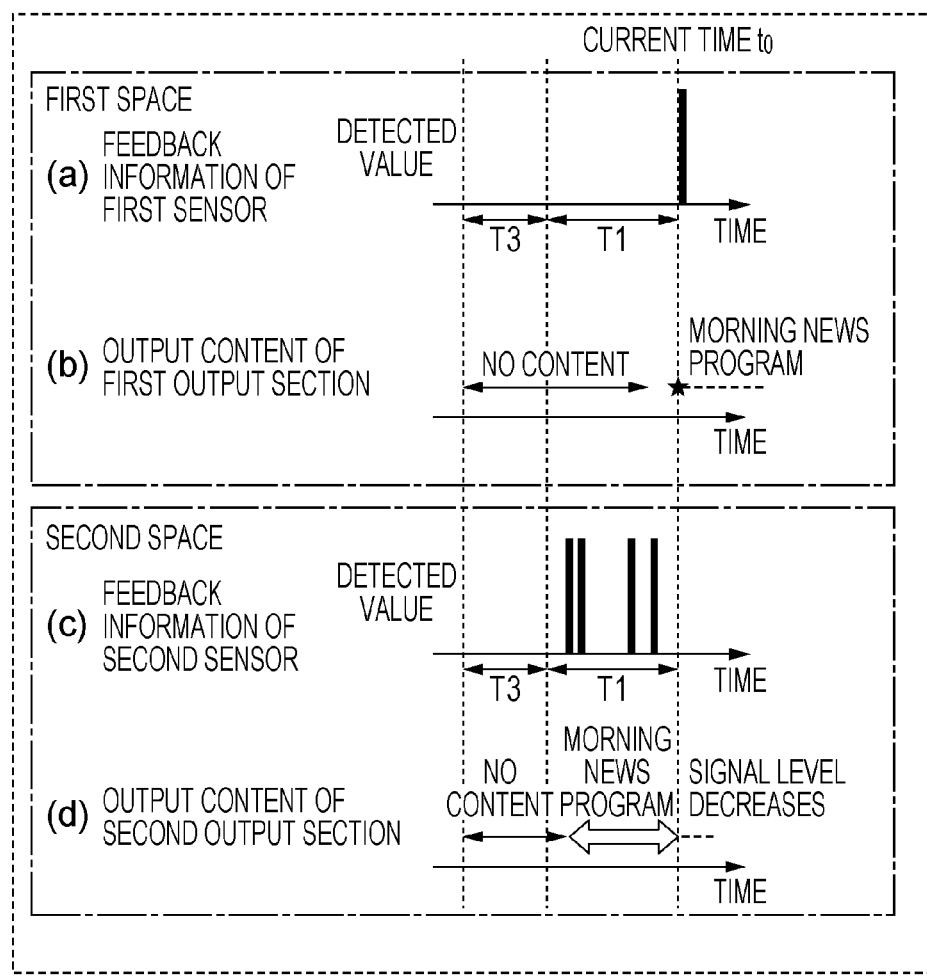
FIG. 15 is a diagram illustrating an example of detection results of sensor sections and output results of output sections in Example 1 of Embodiment 2.

In the present example, it is assumed that the first space 20a is a washroom, the second space 20b is a bed-cum-sitting room, the current time $t_0$ is within a morning time in which a user prepares himself or herself for work. FIG. 15 illustrates detections results of sensor sections and output results of output sections in a case where the user is in the second space 20b until just before the current time $t_0$ and moves to the first space 20a at the current time $t_0$ in order to get ready for work.

FIG. 15 is a diagram illustrating an example of detections results of sensor sections and output results of output sections in Example 1 of Embodiment 2. Note that the example illustrated in FIG. 15 corresponds to the processing in S208 of FIG. 14A.

In the present example, since no feedback information is detected by the first sensor section 21a and feedback information is detected by the second sensor section 21b during the first period (T1), content (a morning news program in FIG. 15) that is output by the second output section 22b immediately before is output by the first output section 22a. As a result, the user can continue to listen, even after moving to the first space 20a, to the content to which the user listened in the second space 20b without performing any operation.

Example 2

In the present example, it is assumed that the first space 20a is a bed-cum-sitting room, the second space 20b is a washroom, and the current time $t_0$ is within a morning time.

Figure 16:
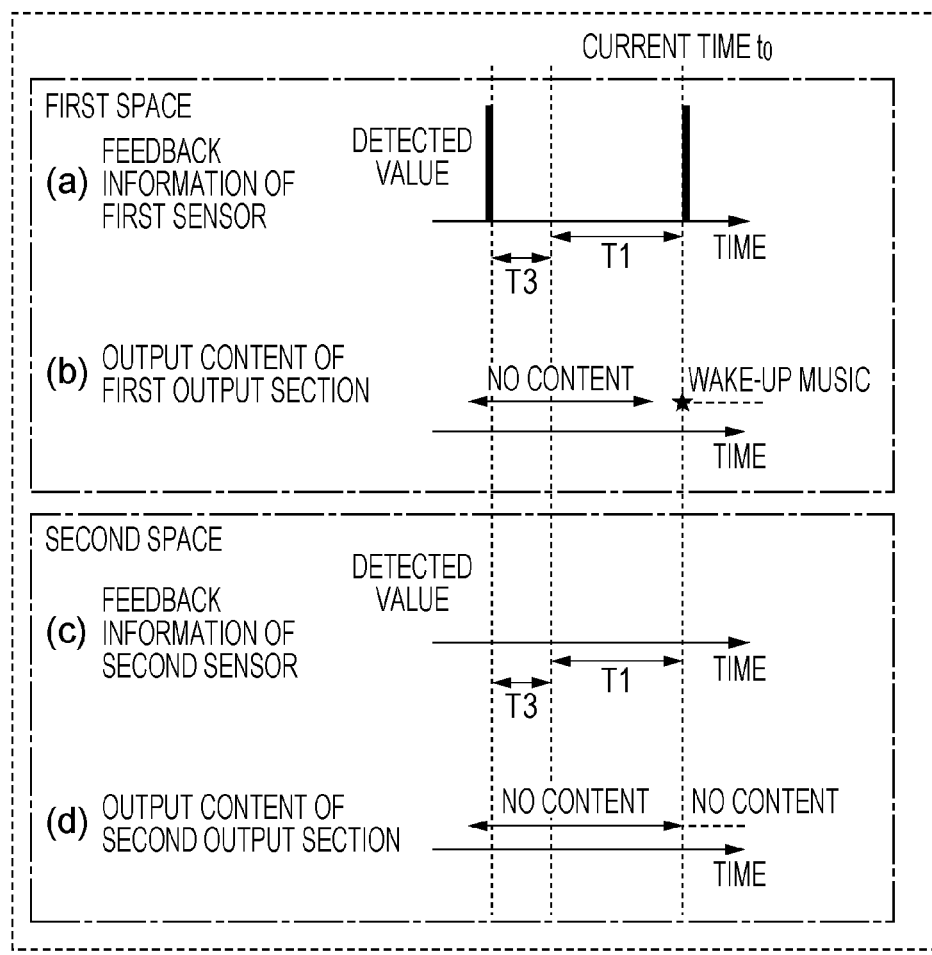
FIG. 16 is a diagram illustrating an example of detection results of sensor sections and output results of output sections in Example 2 of Embodiment 2.

FIG. 16 is a diagram illustrating an example of detections results of sensor sections and output results of output sections in Example 2 of Embodiment 2. FIG. 16 illustrates a life scene that is different from that of FIG. 15. For example, FIG. 16 illustrates a case where a user is sleeping in the first space 20a during the first period (T1) and wakes up and starts activity at the current time $t_0$. Note that the example illustrated in FIG. 16 corresponds to the processing in S212 of FIG. 14B.

In the present example, feedback information is detected by none of the first sensor section 21a and the second sensor section 21b during the first period (T1), and a third period (T3) which is before the first period (T1) and in which feedback information is detected by none of the first sensor section 21a and the second sensor section 21b is equal to or longer than a threshold value τ (for example, five hours). Accordingly, content B (for example, music tracks categorized as "wake-up music") that corresponds to the time zone including the current time $t_0$ is output by the first output section 22a.

In the examples illustrated in FIGS. 15 and 16, the current time $t_0$ is within the same time zone. For example, in a conventional art, feedback information detected during the first period (T1) by the first sensor section 21a and the second sensor section 21b is not used, and therefore only predetermined content is output in the first space 20a. It is therefore impossible to select content in accordance with a user's waking time and the progress of preparation that vary from day to day. In contrast, according to the control method of presented information and the control device of presented information according to the present embodiment, it is possible to select content by taking into consideration a relationship between states before and after user's spatial moving.

Effects and Others of Embodiment 2

As described above, according to the present embodiment, it is possible to provide a control method of presented information and a control device of presented information that are capable of presenting appropriate content by taking into consideration a relationship between states before and after spatial moving by using feedback information during the first period (T1), the second period, and the third period (T3).

In one aspect of the control method of presented information, for example, the acquiring includes the first sensor section and the second sensor section acquiring information concerning a human activity during a third period (T2) that is earlier than the first period; and in the controlling, the control device of presented information performs, as the first control operation, a control operation of (i) determining content that is to be output by the first output section during the second period in accordance with the information concerning time acquired in the acquiring and then (ii) causing the first output section to output the determined content, in a case where (a) it is determined that no human activity is performed during the first period in a first space in which the first sensor section is disposed on the basis of the information concerning a human activity during the first period acquired from the first sensor section, it is determined that a human activity is performed during the second period in the first space on the basis of the information concerning a human activity during the second period acquired from the first sensor section, and it is determined that a human activity is performed during the third period in the first space on the basis of the information concerning a human activity during the third period acquired from the first sensor section and where (b) it is determined that no human activity is performed during the first period and the third period in a second space in which the second sensor section is disposed on the basis of the information concerning a human activity during the first period and the third period acquired from the second sensor section and it is determined that no human activity is performed during the second period in the second space on the basis of the information concerning a human activity during the second period acquired from the second sensor section.

This makes it possible to present appropriate content by taking into consideration a relationship between states before and after spatial moving even in a scene in which content appropriate for a user varies before and after the spatial moving by using feedback information during the first period (T1), the second period, and the third period (T3).

Embodiment 3

In the above embodiments, the control device of presented information 10 includes the feedback matching model DB 103 and the content DB 104. However, the present disclosure is not limited to this. Such an arrangement is also possible in which the feedback matching model DB 103 and/or the content DB 104 are installed in an outside (for example, outside a house), and the control device of presented information 10 achieves the aforementioned functions by accessing the feedback matching model DB 103 and/or the content DB 104 via an outside network such as the Internet.

Figure 17:
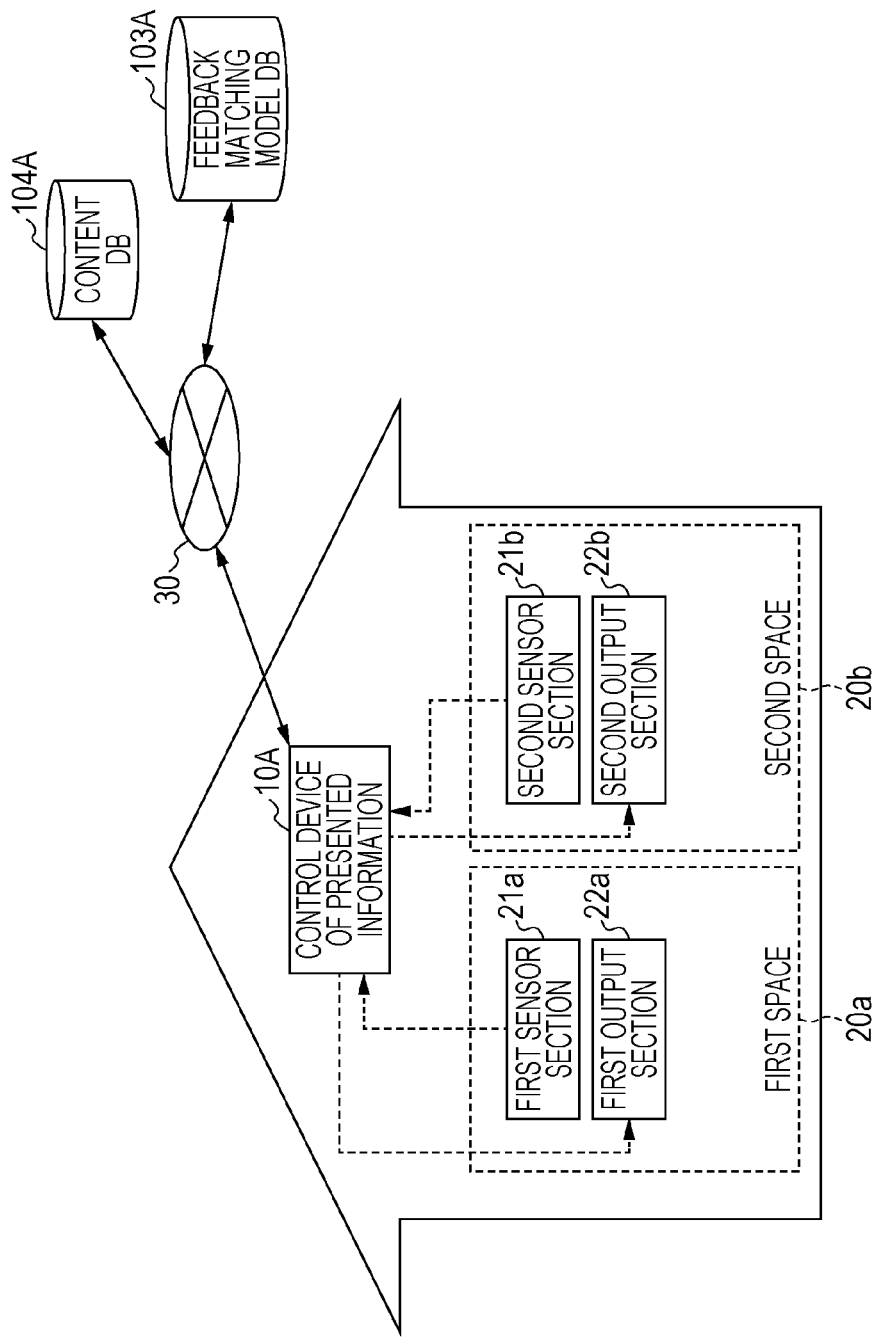
FIG. 17 is a diagram illustrating an example of the way in which a content presentation control system according to Embodiment 3 is installed.
Figure 18:
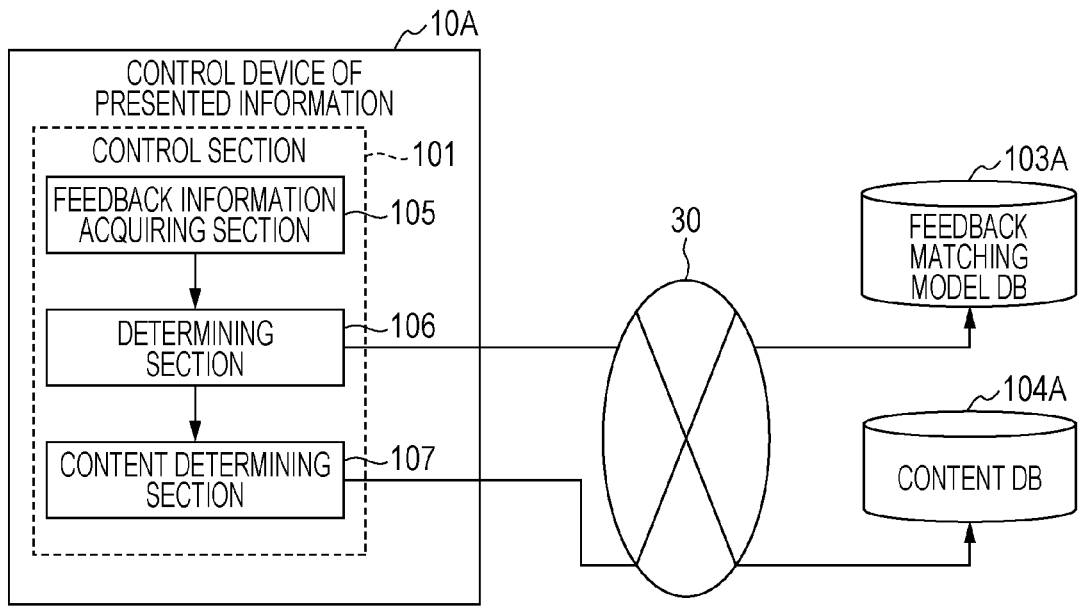
FIG. 18 is a diagram illustrating an example of a configuration of a control device of presented information according to Embodiment 3.

FIG. 17 is a diagram illustrating an example of the way in which a content presentation control system according to Embodiment 3 is installed. FIG. 18 is a diagram illustrating an example of a configuration of a control device of presented information according to Embodiment 3. Note that elements that are similar to those in FIGS. 2 and 5 are given identical reference signs and are not described in detail.

A control device of presented information 10A illustrated in FIG. 18 is different from the control device of presented information 10 illustrated in FIG. 5 in that the control device of presented information 10A does not include a feedback matching model DB 103A and a content DB 104A. The feedback matching model DB 103 and the content DB 104 are connected to the control device of presented information 10A via a network 30 such as the Internet provided outside a house. A first sensor section 21a and a first output section 22a are disposed in a first space 20a, and a second sensor section 21b and a second output section 22b are disposed in a second space 20b, as in Embodiments 1 and 2.

Figure 19:
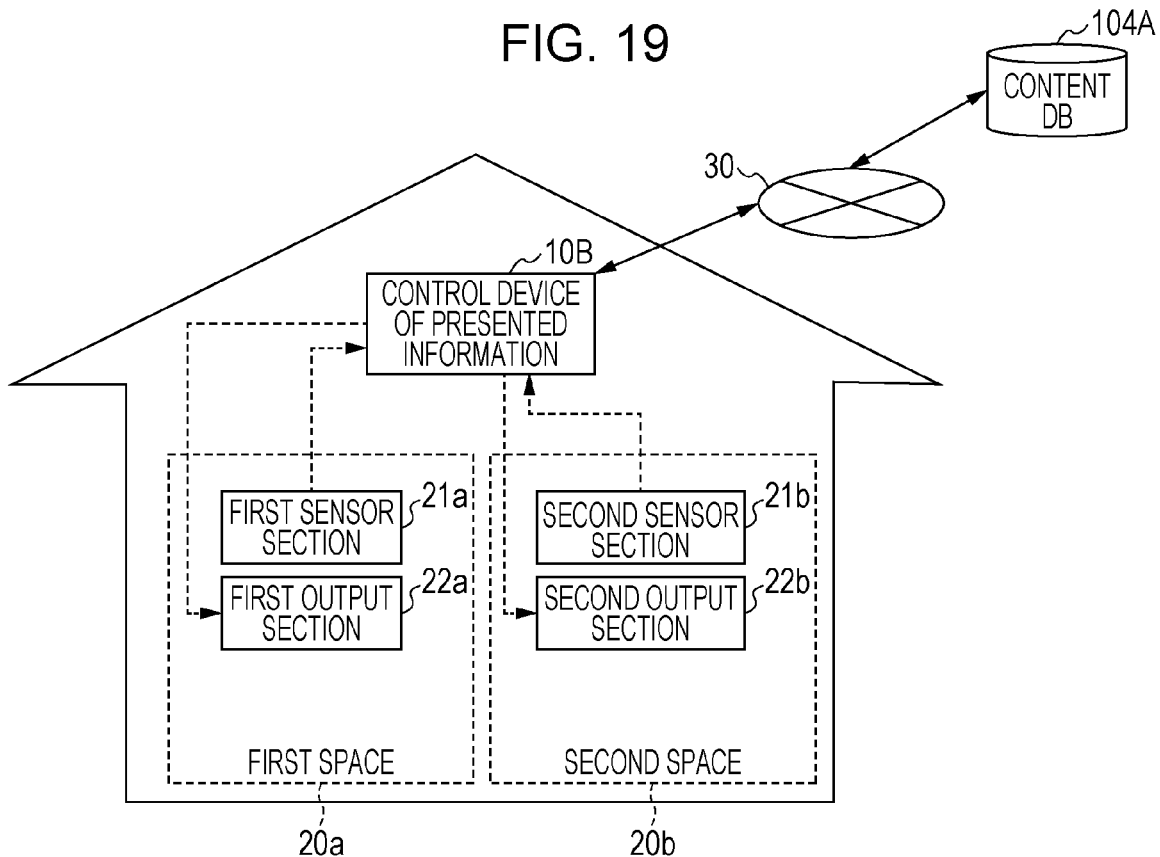
FIG. 19 is a diagram illustrating another example of the way in which the content presentation control system according to Embodiment 3 is installed.
Figure 20:
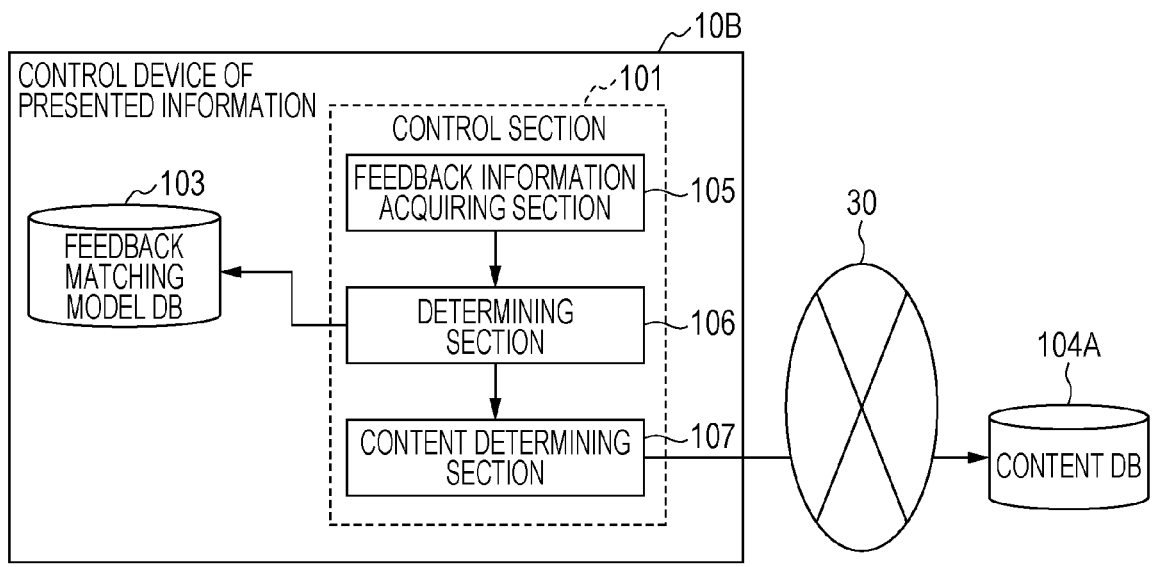
FIG. 20 is a diagram illustrating another example of a configuration of the control device of presented information according to Embodiment 3.

FIG. 19 is a diagram illustrating another example of the way in which the content presentation control system according to Embodiment 3 is installed. FIG. 20 is a diagram illustrating another example of a configuration of the control device of presented information according to Embodiment 3. Note that elements that are similar to those in FIGS. 2 and 5 are given identical reference signs and are not described in detail.

A control device of presented information 10B illustrated in FIG. 20 is different from the control device of presented information 10 illustrated in FIG. 5 in that the control device of presented information 10B does not include a content DB 104A. The content DB 104 is connected to the control device of presented information 10B via a network 30 such as the Internet provided outside a house. A first sensor section 21a and a first output section 22a are disposed in a first space 20a, and a second sensor section 21b and a second output section 22b are disposed in a second space 20b, as in Embodiments 1 and 2.

The examples illustrated in FIGS. 17 through 20 are merely examples, and whether the elements of the control device of presented information 10 illustrated in FIG. 5 is included in the control device of presented information 10 or provided outside a house so as to be connectable via a network may be determined as appropriate.

Embodiment 4

The elements that constitute the control device of presented information 10 are not limited to the examples described in the above embodiments. Elements of a control device of presented information according to Embodiment 4 are described below with reference to FIG. 21.

Configuration of Control Device of Presented Information

Figure 21:
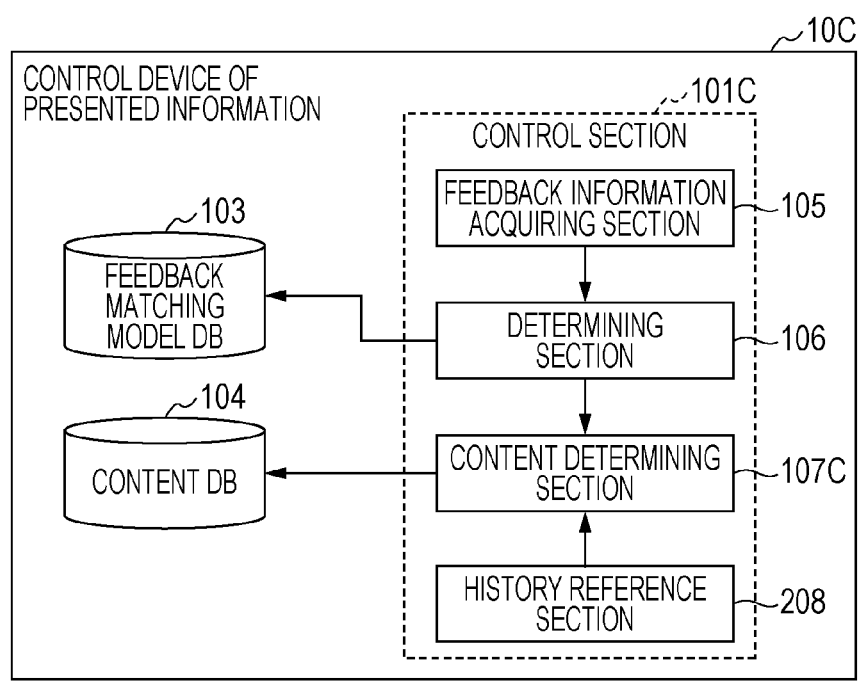
FIG. 21 is a diagram illustrating an example of a configuration of a control device of presented information according to Embodiment 4.

FIG. 21 is a diagram illustrating an example of a configuration of a control device of presented information according to Embodiment 4. Note that elements that are similar to those in FIG. 5 are given identical reference signs and are not described in detail.

A control device of presented information 10C illustrated in FIG. 21 is different from the control device of presented information 10 illustrated in FIG. 5 in terms of a configuration of a control section 101C. The control section 101C includes a history reference section 208 in addition to the elements of the control section 101 illustrated in FIG. 5. Moreover, the control device of presented information 10C illustrated in FIG. 21 is different from the control device of presented information 10 illustrated in FIG. 5 in terms of functions of a content determining section 107C.

The history reference section 208 accumulates, as history information, information concerning a human activity acquired by a plurality of sensor sections and information concerning content output by a plurality of output sections. In the present embodiment, the history reference section 208 accumulates, as history information, feedback information acquired by a feedback information acquiring section 105. The history reference section 208 is referred to when the content determining section 107C determines content. Note that threshold values a and 6, a threshold period τ, time lengths of a first period (T1) and a third period (T3) accumulated in a feedback matching model DB 103 and content candidates accumulated in a content DB 104 may be updated on the basis of the feedback information accumulated in the history reference section 208.

For example, in a case where a determining section 106 determines that a human activity is performed during a second period in a space in which a first sensor section 21a is disposed, the content determining section 107C performs a first control operation of (i) determining content that is output by the first output section 22a during the second period on the basis of information concerning a human activity detected during the first period (T1) by the first sensor section 21a and the second sensor section 21b and the history information accumulated in the history reference section 208 and then (ii) causing the first output section 22a to output the determined content.

In the present embodiment, the content determining section 107C has the functions of the content determining section 107. Moreover, the content determining section 107C determines content on the basis of the determination result of the determining section 206 by referring to the history reference section 208. The content determining section 107C refers to feedback information and output content during the same time zone on past different days with reference to the history reference section 208.

For example, in a case where acquired feedback information is identical or similar to feedback information acquired on past different days by comparing the determination result of the determining section 206 with feedback information and output content during the same time zone on the past different days, the content determining section 107C may determine content that is repeatedly selected in the past different days or may determine content selected on the same day of the week among the past different days.

Note that the other elements and operation are similar to those in Embodiment 1 and description thereof is omitted.

Effects and Others of Embodiment 4

As described above, according to the present embodiment, it is possible to provide a control method of presented information and a control device of presented information that are capable of presenting appropriate content by taking into consideration a relationship between states before and after spatial moving by using feedback information during the first period (T1), the second period, and the third period (T3).

Furthermore, according to the present embodiment, it is possible to present content that is more appropriate for a user by taking into consideration past feedback information and output content.

Embodiment 5

In Embodiment 1, an example of a content presenting device in which a sensor section and an output section that are disposed in the same space are provided together has been described. However, the sensor section and the output section are not limited to this example. One implementation mode of a second sensor section and a second output section in Embodiment 5 is described below with reference to FIGS. 22 and 23.

Figure 22:
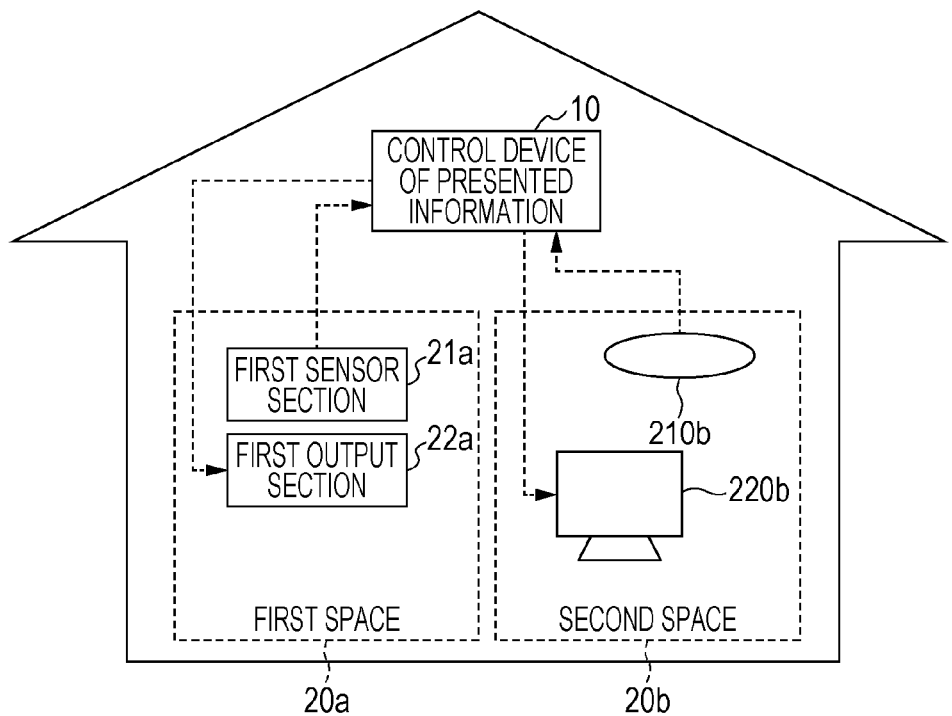
FIG. 22 is a diagram illustrating an example of the way in which a content presentation control system according to Embodiment 5 is installed.

FIG. 22 is a diagram illustrating an example of the way in which a content presentation control system according to Embodiment 5 is installed. Note that elements that are similar to those in FIG. 2 are given identical reference signs and are not described in detail.

The content presentation control system illustrated in FIG. 22 is different from the content presentation control system illustrated in FIG. 2 in that the content presentation control system illustrated in FIG. 22 further includes a household electrical appliance and a lighting apparatus that are disposed in a second space 20b, and a second sensor section and a second output section are included in the household electrical appliance and the lighting apparatus, respectively.

Specifically, the second sensor section is included in a lighting apparatus 210b which is a ceiling illumination, and the second output section is included in a household electrical appliance 220b which is a video audio apparatus such as a TV receiver, and both of the second sensor section and the second output section are disposed in the second space 20b.

More specifically, the second sensor section is provided in the lighting apparatus 210b and detects feedback information such as information concerning a human activity on the basis of operation information of the lighting apparatus 210b. Note that it is also possible to employ an arrangement in which the second sensor section is provided in the household electrical appliance 220b and detects feedback information such as information concerning a human activity on the basis of operation information of the household electrical appliance 220b. With the arrangement, the lighting apparatus 210b and the household electrical appliance 220b in the second space 20b can be used as part of the content presentation control system without separately preparing the second sensor section. The feedback information can be ON/OFF of the lighting apparatus 210b, channel selection information of the household electrical appliance 220b, or the like.

The second output section is a speaker or a display screen provided in the household electrical appliance 220b.

For example, in a case where the TV receiver including the second output section outputs distributed TV reproduction sound source information during the first period (T1), the control device of presented information 10 performs, as the first control operation, a control operation of (i) determining, as content that is to be output by the first output section 22a during the second period, the TV reproduction sound source information that is output by the TV receiver including the second output section and then (ii) causing the first output section 22a to output the TV reproduction sound source information.

Note that the other elements and operation are similar to those in Embodiment 1 and description thereof is omitted.

Figure 23:
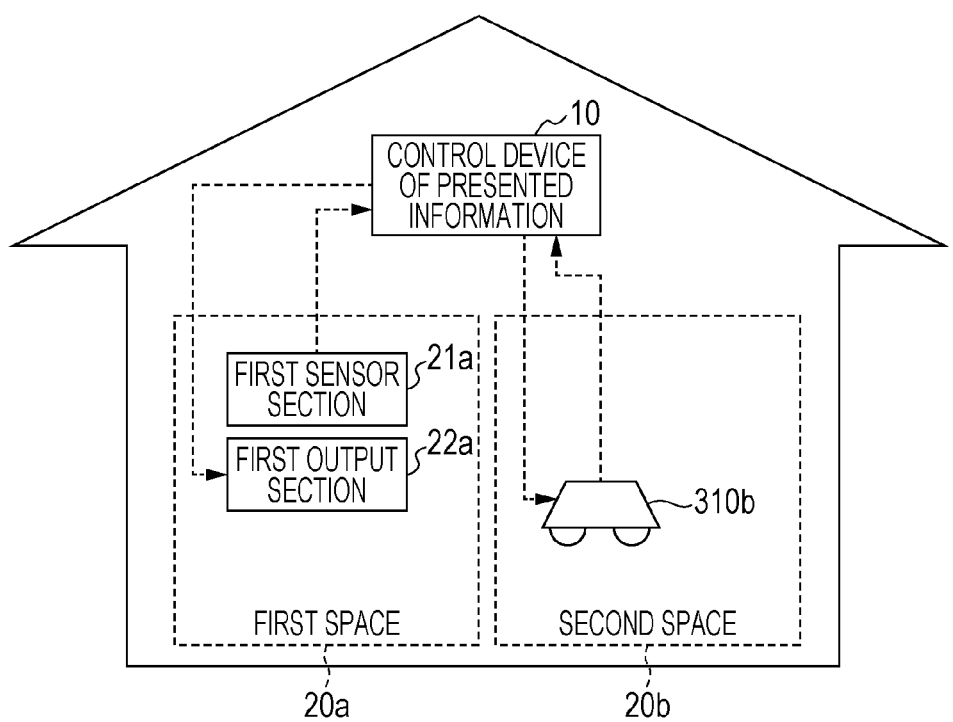
FIG. 23 is a diagram illustrating another example of the way in which the content presentation control system according to Embodiment 5 is installed.

FIG. 23 is a diagram illustrating another example of the way in which the content presentation control system according to Embodiment 5 is installed. Note that elements that are similar to those in FIG. 2 are given identical reference signs and are not described in detail.

The content presentation control system illustrated in FIG. 23 is different from the content presentation control system illustrated in FIG. 2 in that the content presentation control system illustrated in FIG. 23 includes an autonomous mobile indoor agent 310b including a second sensor section and a second output section.

The autonomous mobile indoor agent 310b including a second sensor section and a second output section is disposed in the second space 20b and is movable only within the second space 20b.

With the arrangement, the indoor agent 310b that moves in the second space 20b can be used as part of the content presentation control system without separately preparing the second sensor section and the second output section. In this case, the feedback information can be a result of verbal communication or communication using gestures between a user and the indoor agent.

As described above, according to the present embodiment, it is possible to provide a control method of presented information and a control device of presented information that are capable of presenting appropriate content by taking into consideration a relationship between states before and after spatial moving by using feedback information during the first period (T1) and the second period.

Specifically, in the present embodiment, it is possible to employ an arrangement in which the content presentation control system further includes a TV receiver that is disposed in a space in which the second sensor section is disposed; a second output section that is disposed in the space in which the second sensor section is disposed among the plurality of output sections is a speaker provided in the TV receiver; and in the controlling, in a case where the second output section outputs TV reproduction sound source information distributed to the TV receiver during the first period, the control device of presented information performs, as the first control operation, a control operation of (i) determining the TV reproduction sound source information that is output by the second output section as content that is to be output during the second period by the first output section disposed in the space in which the first sensor section is disposed among the plurality of output sections and then (ii) causing the first output section to output the TV reproduction sound source information. Furthermore, it is possible to employ an arrangement in which the content presentation control system further includes a household electrical appliance or a lighting apparatus that is disposed in a space in which the second sensor section is disposed; the second sensor section is provided in the household electrical appliance or the lighting apparatus; and the second sensor section detects information concerning a human activity on the basis of operation information of the household electrical appliance or the lighting apparatus.

Note that the content presentation control system may further include a TV receiver separately from the second output section, and a control operation of (i) determining TV reproduction sound source information distributed to the TV receiver as content that is to be output by the first output section and then (ii) causing the first output section to output the determined content may be performed as the first control operation in the controlling.

A control method of presented information and the like according to one or a plurality of aspects of the present disclosure have been described above on the basis of the embodiments, but the present disclosure is not limited to these embodiments. Various modifications which a person skilled in the art can think of and combinations of constituent elements in different embodiments may be encompassed within the one or the plurality of aspects of the present disclosure as long as the modifications and the combinations are not deviated from the purpose of the present disclosure.

For example, a speaker in a content presentation control system including a plurality of sensor sections that perform detection in respective different spaces, a plurality of speakers that output content in the respective different spaces, and a control device of presented information that is connected to the plurality of sensor sections and the plurality of speakers via a network and that controls the plurality of sensor sections and the plurality of speakers, the speaker outputting content in accordance with the first control performed by the control device of presented information is also encompassed within the one or the plurality of aspects of the present disclosure.

The present disclosure is useful for a control method of presented information, a control device of presented information, and a speaker.

A content presentation control system according to the present disclosure is applicable to a household content reproduction system, a navigation system, a broadcast system for facilities, and the like.

What is claimed is:

1. A control method of presented information in a control device of presented information connected, via a network, to a first sensor that performs thermal detection in a first space, a second sensor that performs thermal detection in a second space different from the first space, a first output section that outputs content in the first space, and a second output section that outputs content in the second space, the control method of presented information causing a processor of the control device of presented information to execute:

acquiring first information indicating whether a movement of a thermal source being away from the first sensor disposed in the first space and having a surface temperature corresponding to a body temperature of a person in the first space is detected by the first sensor during a first period having a first predetermined time length immediately before a current time, second information indicating whether a movement of a thermal source being away from the second sensor disposed in the second space different from the first space and having a surface temperature corresponding to the body temperature of the person in the second space is detected by the second sensor during the first period, and third information indicating whether a movement of a thermal source being away from the first sensor and having a surface temperature corresponding to the body temperature of the person in the first space is detected by the first sensor during a second period having a second predetermined time length and including the current time that is later than the first period;

when it is determined that there is the thermal source corresponding to the person moving in the first space during the second period on basis of the third information, determining content that is to be output by the first output section during the second period on the basis of (i) a first frequency indicating the number of times that the movement of the thermal source in the first space is detected by the first sensor during the first period, (ii) a second frequency indicating the number of times that the movement of the thermal source in the second space is detected by the second sensor during the first period, wherein the first frequency and the second frequency are respectively calculated using the first information and the second information; and controlling the first output section to output the determined content, wherein the first output section includes a first speaker or first display, wherein the first output section is the first speaker, the first speaker outputs sound source information during the first period, and in the determining, the sound source information output by the first speaker during the first period is determined as the content that is to be output by the first output section during the second period in a case where the first frequency is equal to or larger than a first threshold, and wherein the second output section is a second speaker, and the second speaker outputs sound source information during the first period, and in the determining, the sound source information output by the second speaker during the first period is determined as the content that is to be output by the first output section during the second period in a case where the first frequency is lower than a first threshold, and the second frequency is equal to or larger than a second threshold.

2. The control method of presented information according to claim 1,
wherein the second output section is disposed in the second space.

3. The control method of presented information according to claim 1,
wherein the determining is performed immediately after the acquiring acquires the third information indicating that the movement of the thermal source in the first space is detected by the first sensor during the second period.

4. The control method of presented information according to claim 1, further comprising:
acquiring information concerning time,
wherein, in the determining, the content that is to be output by the first output section is determined on the basis of the first frequency, the second frequency, and the information concerning time.

5. The control method of presented information according to claim 2,
wherein the acquiring further acquires fourth information indicating whether a movement of a thermal source being away from the second sensor and having a surface temperature corresponding to the body temperature of the person in the second space is detected by the second sensor during the second period, and wherein when it is determined that there is the thermal source corresponding to the person moving in the first space during the second period on basis of the third information and that there is no thermal source corresponding to the person moving in the second space during the second period on basis of the fourth information, the determining is executed.

6. The control method of presented information according to claim 4,
wherein the acquiring further acquires (i) fifth information indicating whether a movement of a thermal source being away from the first source sensor section and having a surface temperature corresponding to the body temperature of the person in the first space is detected by the first sensor section during a third period that has a third predetermined time length and that is earlier than the first period, and (ii) sixth information indicating whether a movement of a thermal source being away from the second sensor section and having a surface temperature corresponding to the body temperature of the person in the second space is detected by the second sensor during the third period; and in the determining, content that is to be output by the first output section during the second period is determined in accordance with the information concerning time acquired in the acquiring, in a case where (a) it is determined that there is no thermal source corresponding to the person moving in the first space during the first period on the basis of the first information, it is determined that there is a thermal source corresponding to the person moving in the first space during the second period on the basis of the third information, and it is determined that there is the thermal source corresponding to the person moving in the first space during the third period on the basis of the fifth information, and where (b) it is determined that there is no thermal source corresponding to the person moving in the second space during the first period and the third period on the basis of the second information and the sixth information and it is determined that there is no thermal source corresponding to the person moving in the second space during the second period on the basis of the fourth information.

7. The control method of presented information according to claim 1, further comprising:
accumulating, as history information, the first information, the second information, and third information and information concerning content output by the first output section,
wherein in the determining, the content that is to be output by the first output section during the second period on the basis of the first frequency, the second frequency, and the history information accumulated in the accumulating.

8. The control method of presented information according to claim 5,
wherein the first output section is a first speaker,
the second output section is a second speaker,
the control device of presented information manages output sensitivity information of the first speaker and the second speaker; and
the controlling further includes adjusting a sound pressure level that is to be output by the first speaker during the second period is adjusted on the basis of a sound pressure level that is output by the second speaker during the first period, the output sensitivity information of the first speaker, and the output sensitivity information of the second speaker.

9. A control device of presented information that is connected, via a network, to a first sensor that performs thermal detection in a first space, a second sensor that performs thermal detection in a second space different from the first space, a first output section that outputs content in the first space, and a second output section that outputs content in the second space, the control device of presented information comprising:

a memory that stores a program; and
a processor,
wherein the program causes the processor to execute
acquiring first information indicating whether a movement of a thermal source being away from the first sensor disposed in the first space and having a surface temperature corresponding to the body temperature of a person in the first space is detected by the first sensor during a first period having a first predetermined time length immediately before a current time, second information indicating whether a movement of a thermal source being away from the second sensor disposed in the second space different from the first space and having a surface temperature corresponding to the body temperature of the person in the second space is detected by the second sensor during the first period, and third information indicating whether a movement of a thermal source being away from the first sensor and having a surface temperature corresponding to the body temperature of the person in the first space is detected by the first sensor during a second period having a second predetermined time length and including the current time that is later than the first period;

when it is determined that there is the thermal source corresponding to the person moving in the first space during the second period on basis of the third information, determining content that is to be output by the first output section during the second period on the basis of (i) a first frequency indicating the number of times that the movement of the thermal source in the first space is detected by the first sensor during the first period, and (ii) a second frequency indicating the number of times that the movement of the thermal source in the second space is detected by the second sensor during the first period, wherein the first frequency and the second frequency are respectively calculated using the first information and the second information; and controlling the first output section to output the determined content, wherein the first output section includes a first speaker or first display,
wherein the first output section is the first speaker,
the first speaker outputs sound source information during the first period, and
in the determining, the sound source information output by the first speaker during the first period is determined as the content that is to be output by the first output section during the second period in a case where the first frequency is equal to or larger than a first threshold, and
wherein the second output section is a second speaker, and
the second speaker outputs sound source information during the first period, and
in the determining, the sound source information output by the second speaker during the first period is determined as the content that is to be output by the first output section during the second period in a case where the first frequency is lower than a first threshold, and the second frequency is equal to or larger than a second threshold.

10. The control method of presented information according to claim 2,
wherein the first speaker is a speaker included in a TV receiver that is disposed in the first space, and
wherein the first speaker outputs, as the sound source information, TV reproduction sound source information distributed to the TV receiver disposed in the first space during the first period.

11. The control method of presented information according to claim 2,
wherein the second speaker is a speaker included in a TV receiver that is disposed in the second space,
wherein the second speaker outputs, as the sound source information, TV reproduction sound source information distributed to the TV receiver disposed in the second space during the first period.

* * * * *